United States Patent [19]
Blanyer

[11] 3,750,019
[45] July 31, 1973

[54] SPEED DETECTION METHOD AND APPARATUS

[75] Inventor: Carl G. Blanyer, West Covina, Calif.

[73] Assignee: Abex Corporation, New York, N.Y.

[22] Filed: May 10, 1971

[21] Appl. No.: 141,571

[52] U.S. Cl. .................................. 324/178, 324/189
[51] Int. Cl. ............................................ G01p 3/66
[58] Field of Search .............. 324/178–180, 189–191

[56] References Cited
UNITED STATES PATENTS
| | | | |
|---|---|---|---|
| 2,617,023 | 11/1952 | Weller | 324/179 |
| 3,281,593 | 10/1966 | Mendelsohn | 324/179 |
| 3,573,441 | 4/1971 | Glazar | 324/179 |

*Primary Examiner*—Michael J. Lynch
*Attorney*—Kinzer and Dorn

[57] ABSTRACT

A method and apparatus, operable over a given speed range, for detecting the speed of an object moving past a sensor which develops two electrical signals, each enduring for a time interval that varies inversely with the speed of the object and in inverse relation to the distance between the object and the sensor, the signals being spaced by a time gap that varies inversely with the speed of the object and that also varies as a function of the distance between the object and the sensor. A first capacitor circuit, charged prior to initiation of the sensor signals, is discharged at a given rate during one signal and discharged at a second faster rate thereafter until the other signal starts or until expiration of an extended time interval longer than the longest time gap for the speed range. A similar capacitor circuit is discharged at the given rate during the other signal and at the second rate thereafter until the one signal starts or until expiration of the aforementioned extended time interval. The charges on the two capacitor circuits are compared; the largest residual charge indicates the speed of the object and its direction of travel.

24 Claims, 10 Drawing Figures

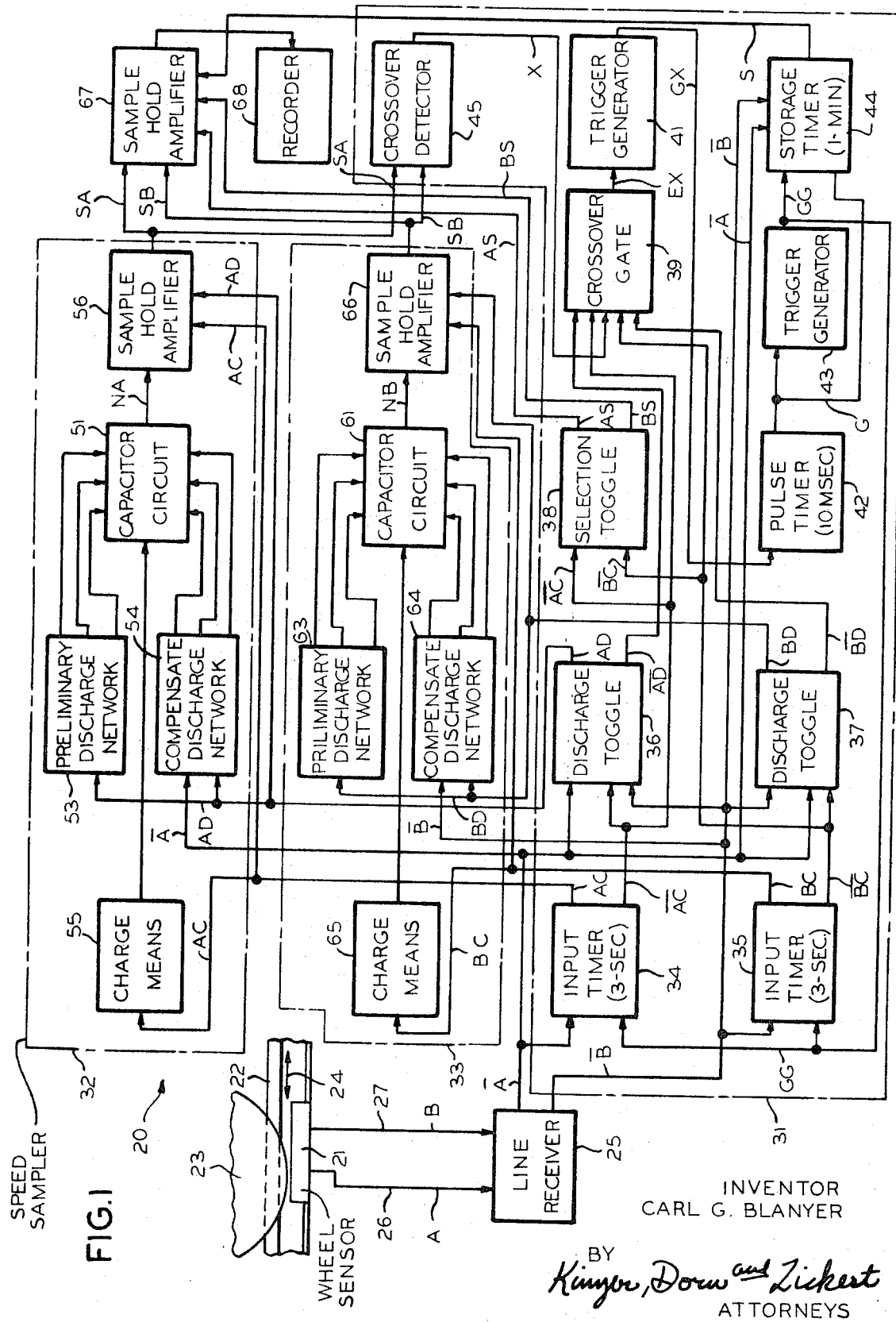

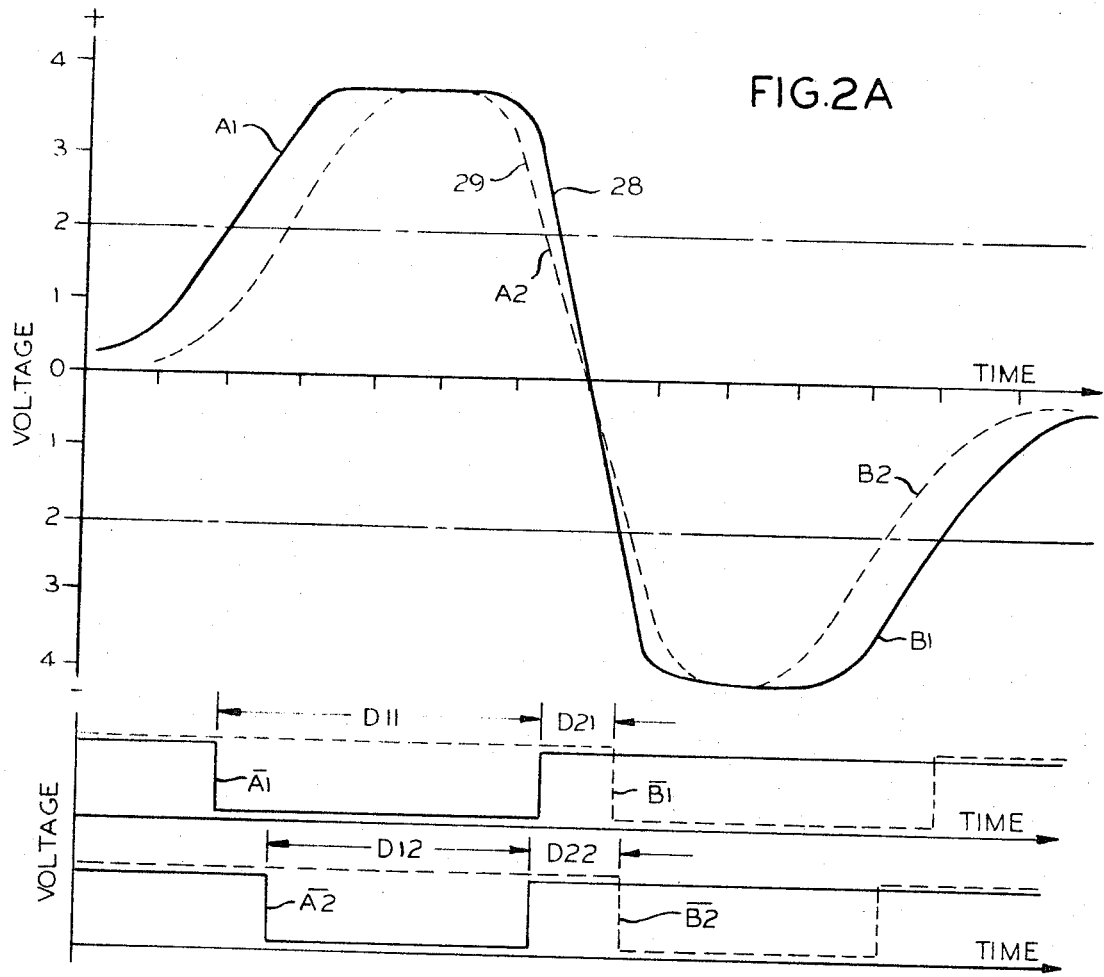
FIG.2A
FIG.2B
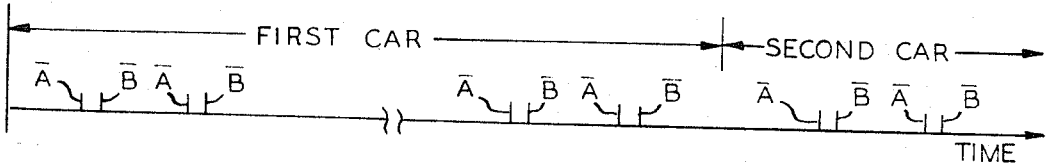
FIG.2C
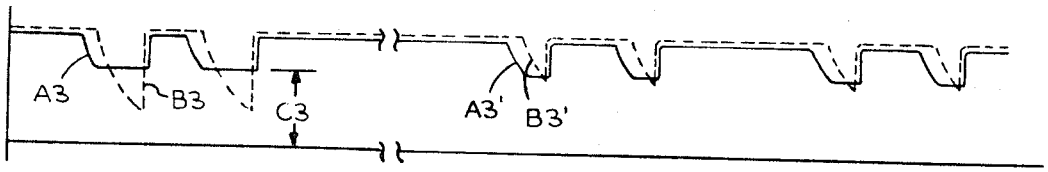
FIG.2D
INVENTOR
CARL G. BLANYER

SPEED DETECTION METHOD AND APPARATUS

CROSS REFERENCE TO RELATED APPLICATION

The speed monitor of the present invention is particularly adapted to utilize wheel presence signals from a wheel sensor of the kind disclosed and claimed in the co-pending application of Carl G. Blanyer, Ser. No. 97,602 filed Dec. 14, 1970, or from a wheel sensor of the kind disclosed and claimed in the co-pending application of Carl G. Blanyer, Ser. No. 202,755, filed Nov. 29, 1971, but may also utilize input signals from other sensing devices.

BACKGROUND OF THE INVENTION

In controlling the operation of a railway system, including main lines, feeder lines, and yards, it is often highly desirable to obtain a reliable and prompt identification of the speed, direction of movement, and number of cars moving along any given segment of the railway. Because of the difficult operating conditions entailed, in many instances, it is highly desirable to use a sensor that is not physically engaged by any part of the car or cars moving along the railway track. Track switches that contact the car wheels or other parts of the cars are often unreliable due to variations in wheel geometry and in car dimensions. Consequently, sensors have been developed that detect the passage of a car wheel, or some other part of the car, by identifying the disturbance of a magnetic field or an electrical field through which the wheel flanges or other car elements pass.

A particularly effective wheel sensor of this kind is disclosed in the aforementioned co-pending application of Carl G. Blanyer, Ser. No. 97,602. That sensor comprises two vertically oriented tuned pickup coils that are spaced a short distance longitudinally of the railway rail and that generate electromagnetic fields through which a wheel flange passes successively in moving past the sensor. The coils are connected in a bridge circuit excited by a high frequency signal; a synchronous detector is coupled to the bridge and to the excitation source, the entire device being mounted in a small, compact, non-magnetic housing. The output signal from the sensor comprises two electrical signals each enduring for a time interval that varies inversely with the speed of the moving car wheel, the signals being spaced by a short time gap that also varies inversely with the speed of the wheel.

If the dimensions of the railway wheels were uniform, and if the lateral displacement of the wheels relative to the rails were constant, the determination of speed from the output signals of a sensor of this kind would not be particularly difficult. However, railway wheels are notoriously variable in their dimensions; they also vary in their horizontal alignment with the rail head. As a consequence, the time duration of the electrical signals developed by the sensor, which vary as an inverse function of the distance between the wheel flange and the sensor, may be noticeably different for individual wheels moving at identical speeds. Moreover, with a practical wheel sensor in which the spacing between the two coils is quite small, so that there is substantial overlap between the fields of the two coils, the time gap between the two sensor signals varies in accordance with a somewhat indeterminate function of the distance between the wheel flange and the sensor. In effect, the output signals from the sensor afford an "elastic ruler" for measuring the speed of the car wheel, the elasticity being a rather complex function of wheel geometry and of the lateral displacement of the wheel relative to the centerline of the sensor.

There are numerous other applications in which it is desirable to measure the speed of a moving object without physical engagement of the object, where that movement can be detected by the disturbance of an electromagnetic field, using a sensor of the general kind discussed above. For example, a highway vehicle moving along a road can be sensed, in various ways, by field-disturbance sensing devices that may exhibit the same kind of variations in accordance with displacement of the sensed vehicle from the sensor apparatus. Another application of a quite different nature entails the detection of the speed of a golf club at the point of impact with a golf ball, at the bottom of the swing. Displacement of the golf club head from a centerline extending through the center of the golf ball, and hence from a desired path past the sensor, may have a substantial effect upon the sensor output.

With any sensor that includes two sensing elements, whether these be field-disturbance elements or physical contact elements, the time interval from the initiation of the output signal from the first sensing element to the initial output from the second sensing element is inversely proportional to the speed of the moving object being sensed. Conversion of the time measurement to a speed measurement can be accomplished by a division process, but this technique tend to be relatively clumsy. Division is most easily effected on a digital basis, but a large speed range may require the division apparatus to utilize enormous numbers of digits at the high end of the range. For example, in railway operations, the speed range may extend from 1 to 100 miles per hour, entailing the processing of extremely large digital numbers at the high end of the range. Consequently, analog techniques may be preferable to digital division, in converting from time measurement to a speed indication, particularly where the required speed range is relatively large.

In any industrialized operation, such as the control of a railway system, false signals may occasionally originate from the sensing equipment; it may be virtually impossible to eliminate such signals entirely. For example, a heavy shock applied to a rail on which a sensor is mounted may disturb the sensor sufficiently to produce an erroneous output from the device. Other potential errors may be created by failure of the sensor to produce a signal, in any given instance. For effective control, the speed detection apparatus must be capable of distinguishing erroneous signals, whether caused by additional spurious signals or by the omission of significant signals.

SUMMARY OF THE INVENTION

Accordingly, it is a primary object of the present invention to provide a new and improved method and apparatus for detecting the speed of an object moving along a given path past a sensor which develops two electrical signals each enduring for a time interval that varies inversely with the speed of the moving object and spaced by a time gap that also varies inversely with the speed of the moving object, where the duration of the electrical signals and of the time gap may also vary in response to variations in the distance between the object and the sensor.

Another object of the invention is to provide a new and improved analog method and apparatus, in a speed detector operable over a wide range of speeds, for converting electrical signals indicative of time duration to signals representative of speed without entailing a direct multiplication or division process.

A specific object of the invention is to compensate for differential variations in the length of the time gap between two output signals from a field-disturbance sensor that senses the movement of an object along a given path past the sensor.

Another object of the invention is to provide a new and improved method and apparatus for determining both the speed and the direction of movement of an object past a sensing device of the field-disturbance type.

An additional object of the invention is to provide a new and improved analog method and apparatus for speed detection, using a field-disturbance sensor, that is effectively self-compensating with respect to errors that may arise both from additional spurious signals and from omitted signals.

A specific object of the invention is to provide a new and improved method and apparatus for detecting the speed of an object moving along a given path past a sensor that retains the speed data for a period of time adequate to allow effective supervisory action by a system operator.

A particular object of the invention is to provide a new and improved all-electronic analog speed detector that is compact in size and relatively inexpensive to manufacture, yet rugged enough for use in highly adverse environments such as railraod service.

Accordingly, the present invention is directed to a method and apparatus for detecting, within a given speed range, the velocity of an object moving along a given path past a sensor which develops two electrical signals on different circuits, each signal enduring for a time interval that varies inversely with the speed of the moving object and that also varies as an inverse function of the distance between the object and the sensor, the sensor signals being spaced by a time gap that varies inversely with the speed of the moving object and that also varies as a function of the distance between the object and the sensor. The method of the invention comprises the following steps:

A. Maintaining a first capacitor circuit and a second capacitor circuit in an initial charge condition before initiation of the sensor signals.

B. Initiating a change in the charge condition of the first capacitor circuit through a first network having a given time constant upon initiation of one of the sensor signals.

C. Continuing the change in the charge condition of the first capacitor circuit through a modified network having a substantially different time constant upon expiration of the one sensor signal.

D. Interrupting the change in charge condition of the first capacitor circuit upon expiration of an extended time interval longer than the longest possible time gap within the aforesaid speed range or upon initiation of the other sensor signal, whichever first occurs.

E. Initiating a change in the charge condition of the second capacitor circuit through a second network having a time constant equal to the aforementioned given time constant upon initiation of the other sensor signal.

F. Continuing the change in the charge condition of the second capacitor circuit through a modified discharge network having a time constant equal to the aforementioned different time constant upon expiration of the other sensor signal.

G. Interrupting the change in charge condition of the second capacitor circuit upon expiration of an extended time interval longer than the longest possible time gap within the speed range or upon initiation of the one sensor signal, whichever first occurs.

H. And comparing the residual charges on the capacitors circuits to determine the speed of the object and its direction of movement.

The speed detector of the invention comprises an A signal sampler and a B signal sampler, each including a capacitor circuit, a charge-establishing means for normally maintaining the capacitor circuit in an initial charge condition, a preliminary network having a given time constant when connected to the capacitor circuit, and a secondary network having a substantially different time constant when connected to the capacitor circuit. Logic means are connected to the sensor and to the two samplers for:

1. disconnecting the capacitor circuit from the charge-establishing means and connecting the capacitor circuit to the preliminary network in each sampler upon initiation of the sensor signal for that sampler;
2. connecting the capacitor circuit to the secondary network in each sampler upon termination of the sensor signal for that sampler; and
3. disconnecting the capacitor circuit from both networks, in each sampler, upon initiation of the sensor signal for the other sampler or upon expiration of an extended time interval longer than the longest possible time gap within the aforementioned speed range, whichever first occurs.

The detector further comprises comparison means for comparing the residual charges on the capacitor circuits to determine which has changed the least from its initial charge condition and thereby determine the direction of movement of the object. Output means are provided for measuring the terminal charge on the least-changed capacitor circuit to determine the speed of the object.

BRIEF DESCRIPTION OF THE DRAWINGS

FIG. 1 is a block diagram of the speed detector constructed in accordance with a preferred embodiment of the present invention;

FIGS. 2A through 2D are a series of waveform diagrams illustrative some of the basic techniques entailed in the method of the present invention;

DESCRIPTION OF THE PREFERRED EMBODIMENTS

Figure 3:
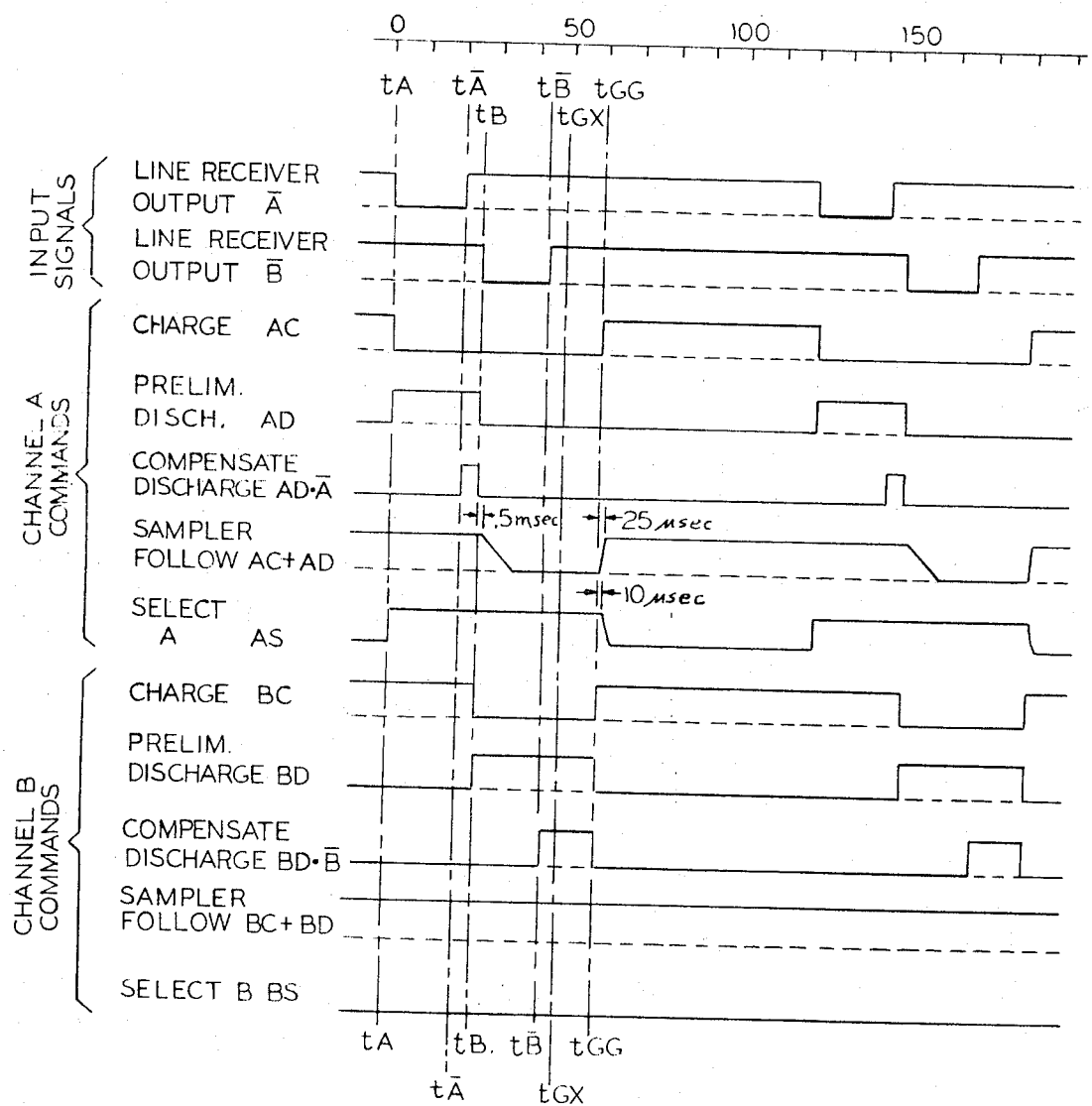
FIGS. 3 and 4 are a series of waveforms illustrating the specific signals developed in the speed detector of FIG. 1, in timed relation to each other.

FIG. 1 illustrates a speed detector 20 constructed in accordance with a preferred embodiment of the present invention. The input to speed detector 20 is derived from a wheel sensor 21 mounted upon a railway rail 22. Wheel sensor 21 preferably conforms to the construction described and claimed in the aforementioned copending application of Carl G. Blanyer, Ser. No. 97,602. Thus, sensor 21 includes two tuned pick-up coils having vertically oriented axes, spaced a short distance longitudinally of rail 22; in a typical construction, the center-to-center spacing between the pick-up coils in sensor 21 may be of the order of four and one-half inches. The pick-up coils in the wheel sensor 21 generate electromagnetic fields that are traversed by the flange of a railway wheel 23 moving past the sensor along a path generally indicated by the arrows 24.

The wheel sensor 21 has two output circuits 26 and 27 that are connected to a line receiver 25. The output signal from sensor 21, the signal appearing on the output conductors 26 and 27, is a differential signal for which nominal full voltage is approximately plus or minus four volts. The waveform of the output signal from sensor 21 is illustrated in FIG. 2A. The sensor output is positive-going for signals effected by the disturbance of the field of one coil in the sensor and negative-going for the other coil; thus, a sequence of plus-to-minus occurs, as shown in FIG. 2A, for motion in one direction, whereas a sequence of minus-to-plus occurs upon movement of the wheel past the sensor in the opposite direction. The overall duration of the output signal for each coil is approximately 50 milliseconds at 10 miles per hour and varies inversely with speed.

FIGS. 2A through 2D illustrate the problems and difficulties involved in the utilization of output signals from sensor 21 for speed determination, and also illustrate some of the basic techniques employed in the method of the present invention. In FIG. 2A the curve 28, comprising pulses A1 and B1, illustrates the output signal from the wheel sensor for a wheel of given dimensions moving through the fields of the two coils of the sensor at a particular speed. As shown therein, the initial signal pulse A1 exhibits a gradual positive-going rise in voltage, from a steady-state initial value, up to a peak of approximately four volts. As the wheel flange passes beyond the field of the first coil, pulse A1 decreases in amplitude. The signal then passes the steady state level, increasing in amplitude in a negative-going direction as the wheel flange enters the field of the second coil, generating the pulse B1. Thereafter, the output signal reaches a level of approximately four volts below the steady-state value and subsequently returns rather gradually toward the steady-state voltage as the wheel moves away from the sensor. The two signal pulses A1 and B1 are not of symmetrical configuration, but are quite similar in waveform to each other.

The dash line curve 29 in FIG. 2A illustrates the output signal from wheel sensor 21 for a wheel having a flange that is smaller than the flange that develops the output signal 28, or that is displaced laterally from the center line of the sensor. That is, the wheel producing sensor signal 29 does not penetrate the fields of the sensor to the same extent as the wheel flange that produces the output signal 28. The wheels producing sensor signals 28 and 29, however, are moving at the same speed.

The sensor output signal 29 is generally similar to signal 28, but the rise of the voltage for its two pulses A2 and B2 is somewhat more gradual, and the periods during which the peak voltages are developed are shorter. Nevertheless, since curves 28 and 29 represent signals produced by wheels moving past the sensor at the same speed, they must be interpreted to produce the same speed indication.

In working with sensor signals corresponding to curves 28 and 29 in FIG. 2A, the initial problem is to select the voltage level at which the signal is considered to start and to stop in any given instance. A practical working value is one-half the peak amplitude of the output signal from the sensor, in this instance 2 volts. However, it will be recognized that other levels could be selected as desired.

The amplitude of the sensor signals is affected, at the beginning and end of each signal pulse, by the displacement of the wheel relative to the sensor. Thus, it is seen that the wheel with the smaller flange, generating the output signal 29, produces an effective reduction in the initial amplitude of pulse A2 as compared with pulse A1 so that the median level of 2 volts is reached later in time than for the wheel having a larger flange. Of course, the same effect is observed in the decreasing amplitude of pulse B2. Moreover, pulse A2 returns to the median 2-volt level sooner than pulse A1, and pulse B2 reaches the negative 2-volt level later than pulse B1.

The signals from sensor 21 are converted to standard digital form in line receiver 25 (FIG. 1). Using standard digital nomenclature (high = true = 1, low = false = 0), and adopting the convention that the sensor output voltage is positive when one coil is disturbed and hence the output A is high and output B is low, and vice versa, the relationships are:

| sensor output | $\bar{A}$ | $\bar{B}$ |
|---|---|---|
| None (below threshold) | 1 | 1 |
| + | 0 | 1 |
| − | 1 | 0 |

The line receiver provides the requisite precise threshold for the sensor output, in this instance plus or minus two volts; it is also employed to reject noise, drift, and common-mode voltages. The line receiver may be constructed to afford a small hysteresis zone in order to reduce output chatter; a trip value of 2.2 volts and a reset of 2.0 volts can be utilized. With this arrangement, drift and noise up to one-half of full signal do not cause false responses. Ture responses still occur if the sensor output falls as low as one-half the normal minimum.

In digital form, the sensor signal pulse A1 takes the form shown in FIG. 2B by the output signal $\bar{A1}$ from the line receiver. Similarly, in digital form signal pulse B1 is represented by the signal $\bar{B1}$. The time interval during which the first signal $\bar{A1}$ endures is the time D11 and the two signals $\bar{A1}$ and B1 are separate by the time gap D21. The corresponding conversion to digital form for the sensor signal pulses A2 and B2 produces the line receiver output waveforms $\bar{A2}$ and $\bar{B2}$. The time duration of signal $\bar{A2}$ is shown in FIG. 2A as being D12, and the separation between signals $\bar{A2}$ and $\bar{B2}$ is the time gap D22.

The overall duration of the two time intervals D11 and D21 is approximately equal to the total of the two time intervals D12 and D22, but there is some differential. It can be seen that the time gap D22 has increased, partially compensating for the reduction in the signal duration interval D12. However, because the total of the two times D12 and D22 is not quite as great as the total of the times D11 and D12, some compensation is necessary if accurate speed information is to be derived from the total of these two time intervals. This is accomplished, in accordance with the present invention, by emphasizing the effect of the time gaps between sensor signals, such as the gaps D21 and D22, in the speed determination process. By empirical study, using a field-disturbance wheel sensor 21 with overlapping fields and a coil separation of 4.5 inches, for which the distance traversed by a wheel between effective sensor signal initiations is about ten inches, it has been determined that the time gap emphasis should be of the order of about 3:1. This relationship may vary somewhat, depending upon the dimensions of the sensor, the operating frequency, and other factors in the sensor construction.

With this emphasis on the time gap D21 or D22 between the two digitized sensor signals, which is directly related to the physical gap between the coils in the sensor, it is possible to determine an effective measuring distance for the sensor. In a sensor of the kind shown in the aforementioned Blanyer application, excited at a frequency of ten kilohertz and with a physical spacing between coil axes of 4.5 inches, the effective measuring distance EMD for the sensor, determined by the expression $$EMD = D1 + 3D2,$$

has been established as approximately 11.5 inches.

In detecting the speed of railway wheels, the pattern of the wheels passing sensor 21 must be taken into account. Typically, railway cars have two or three wheels per truck, with each car having two trucks which are located near the opposite ends of the car. The spacing between wheels in a truck is substantially smaller than the spacing between the wheels on the trucks of adjacent cars and is much larger than the spacing between the sensor coils. The spacing between the trucks on a single car, of course, is substantially larger than the spacing between the trucks of adjacent cars. Thus, considering only the initiation of each digitized sensor signal, the passage of one complete car and the first truck of a second car past the sensor 21 produces a pattern of pulse signals of the kind shown in FIG. 2C.

The signal pulse $\overline{A}$ (FIG. 2C) can be utilized to initiate the discharge of a capacitor, and that discharge can be terminated upon initiation of the next signal pulse $\overline{B}$, with the capacitor charge held constant thereafter, producing the waveform A3 of FIG. 2D. Similarly, the pulse signal $\overline{B}$ can be utilized to initiate the discharge of a capacitor, with the discharge continuing for a time interval longer than the greatest possible time gap between the pulses produced by a single wheel passing over the sensor, as shown in FIG. 2D by the waveform D3. If the capacitors are essentially identical, and if they have the same initial charge, it can be seen that the charge on the capacitor that produces the signal B3 always reaches a lower value than the signal A3. This identifies the direction of movement of the wheel past sensor 21. Furthermore, the residual charge C3, the lowest value of the stored signal A3, is representative of the actual speed of the wheel. Thus, the stored signal voltage C3 can be sampled to afford a continuing indication of the speed of successive wheels on the train as the wheel pass sensor 21. In practice, discharge of the second capacitor may be interrupted shortly after a crossover occurs, when signal B3 falls below signal A3, as indicated by signals A3' and B3' in FIG. 2D.

If the direction of train movement is reversed, the result will be waveforms identical to those shown in FIGS. 2C and 2D but with the sequence of the signals $\overline{A}$ and $\overline{B}$ reversed. Under these circumstances, the speed determination signals A3 and B3 (or A3' and B3') are interchanged, producing an identical speed indication, but also indicating the different direction of train movement. The amplitude of the speed-indicating residual charge C3 remains unchanged.

If the speed of the train is increased, the capacitor whose charge produces the signal A3 discharges to a lesser extent, and the residual charge C3 increases in proportion to the change in speed. By the same token, for a lower train speed there is a longer time interval between the pulses $\overline{A}$ and $\overline{B}$, the capacitor that develops signal A3 is discharged to a lower value, and the residual charge C3 is reduced to an extent corresponding to the speed reduction.

The waveforms A3 and B3 can also be developed by charging two capacitors instead of discharging them. This can be visualized by assuming that the upper charge limit of the waveforms of FIG. 2D is zero voltage or some other convenient reference and that the two capacitors are charged negatively toward a given maximum negative charge represented by the solid line at the bottom of FIG. 2D. The speed-representative charge C3 then represents the difference between the lesser charge on the first capacitor (signal A3) and the maximum negative charge.

In developing the signals A3 and B3 (or A3' and B3'), capacitor storage circuits are most convenient and practical for many applications. However, other forms of electrical signal storage circuits, in which a stored signal value can be progressively altered in accordance with given time constants, can also be employed. Thus, electrical signal storage circuits employing inductors as the principal storage elements can be utilized, with the stored signals constituting electrical currents instead of voltages. The sensor input signals and the output signals, and even the waveforms, remain essentially similar to those described and illustrated for capacitor storage circuits.

The foregoing explanation of the waveforms of FIGS. 2C and 2D does not take into account the necessity for weighting of the gap between signals from the sensor as discussed above. The requisite emphasis for the time gap between the sensor signals is accomplished by changing the discharge rates for the capacitors that develop the signals A3 and B3, or A3' and B3', upon termination of the sensor signals that initiates their discharge (or charge). This weighting process will be more fully apparent from the description of operation of the speed detector 20 of FIG. 1, set forth hereinafter.

The use of the residual charge C3 is valid only to the extent that the exponential discharge rate (or charge rate) for the capacitors developing waveforms A3 and B3 approximates an inverse function. Over a quite limited speed range, a single capacitor with a selected charging or discharging network of given time constant can afford reasonable accuracy. For a broad speed range, however, a cumulative discharge or charge curve, using several capacitors with different network time constants, is necessary to attain the necessary close conformation to a true inverse function. For a range of 1 mph to 100 mph, speed detector 20 employs three capacitors for each of these operations.

Speed detector 20 (FIG. 1) includes a logic control unit 31 and two speed samplers 32 and 33. In the logic control unit 31, there are two input timers 34 and 35 of essentially identical construction. The set input to timer 34 is derived from the A output of line receiver 25. The set input to timer 35 is taken from the $\bar{B}$ output of line receiver 25. Each of the timers 34 and 35 is, essentially, a monostable multivibrator actuated from a normal stable condition to a second operating condition by a set input signal and reverting to the normal stable condition upon expiration of a fixed time interval, unless reset earlier. The time interval is made somewhat longer than the longest possible time gap between signals $\bar{A}$ and $\bar{B}$ for any speed within the operating range of detector 20; it should also be longer than the longest computing interval at the lowest speed. In this instance, the time interval is three seconds. Timer 34 has two charge command signal outputs AC and $\overline{AC}$; similarly, timer 35 has two outputs BC and $\overline{BC}$.

The logic control unit 31 also includes two discharge toggle circuits 36 and 37, each comprising a substantially conventional flip-flop circuit. The set input to discharge toggle 36 is connected to the $\bar{A}$ output of line receiver 25. The reset input to discharge toggle 36 is connected to the $\overline{AC}$ output of timer 34. The reset input to discharge toggle 36 is also connected to the $\bar{B}$ output of line receiver 25. Discharge toggle 36 has two discharge control signal outputs AD and $\overline{AD}$. For discharge toggle 37, the set input is taken from the $\bar{B}$ output of line receiver 25. The reset input for discharge toggle 37 is connected to the $\overline{BC}$ output of timer 35 and is also connected to the $\bar{A}$ output of line receiver 25. Discharge toggle 37 has two discharge control signal outputs BD and $\overline{BD}$.

A selection toggle circuit 38 is incorporated in logic control unit 31. The selection toggle circuit 38 comprises a flip-flop circuit with a small inherent time delay. One input to the selection toggle is connected to the $\overline{AC}$ output of timer 34. The other input to selection toggle 38 is derived from the $\overline{BC}$ output of timer 35. Toggle 38 has two selection signal outputs, AS and BS, connected to the output stage of speed detector 20.

The $\overline{AD}$ output of discharge toggle 36 is connected to one input of a crossover gate circuit 39. The output $\overline{BD}$ of discharge toggle 37 is connected to another input for the crossover gate. Crossover gate 39 has two additional inputs, connected to the $\overline{AC}$ output of timer 34 and to the $\overline{BD}$ output of timer 35. There is a fifth input to crossover gate 39, taken from the output X of a crossover detector 45.

Crossover gate 39 has an output EX that is connected to a trigger generator 41 having an output GX. The trigger generator output GX is connected to the input of a pulse timer 42. Pulse timer 42 may comprise a monostable multivibrator having an operating time interval determined principally by the time necessary for a sample-and-hold amplifier to obtain a good sample, and hence is quite brief. In this instance, the operating time interval for pulse timer 24 is 10 milliseconds.

The output G pf pulse timer 42 is connected to the input of a trigger generator circuit 43. Trigger generator 43 may comprise any circuit suitable for generation of a brief, sharply-defined signal pulse, with an extremely small delay following the application thereto of an input signal. The output GG of trigger generator 43 is connected to the set input of a monostable multivibrator storage timer 44. Timer 44 also has a reset input connected to the output G of pulse timer 42. In addition, there are two enabling inputs for storage timer 44 which are connected to the outputs $\bar{A}$ and $\bar{B}$ of line receiver 25. Storage timer 44 is constructed to afford a relatively long time interval, on the order of 45 seconds to 1 minute, in its operation.

To complete the internal connections within logic unit 31, the output GG of trigger generator 43 is connected to a reset input for timer 34 and to a reset input for timer 35.

One of the principal components in speed sampler 32 is a capacitor circuit 51. As pointed out above, the discharge (or charge) characteristic of a capacitor affords an approximation of an inverse relationship curve, within a limited range. The operation of speed samplers 32 and 33 is based upon a RC network discharge function that approximates $K/t$, where K is a constant dependent upon the effective measuring distance of the sensor 21 and $t$ is time. Just as a complex waveform can be approximated by the summation of a fundamental frequency signal and harmonics of that signal, a transient such as the inverse function $K/t$ can be approximated by the sum of several exponential-decay transients. In the speed samplers 32 and 33 of speed detector 20, the function $$F(t) = 1/t$$

is computed, within approximately plus or minus one-half percent of the maximum value for $t$, over a range of t between 0.01 and 1, in accordance with the following summation:

$$F_1(t) = 235.5e^{-156.1t} + 54.5e^{-29.8t} + 9.0e^{-4.6t} + 1.$$

This function is effected by three simple exponential decays, comprising three capacitors connected in series in the capacitor circuit 51, and a small constant. The coefficients are proportional to the initial values of charge on the capacitors while the constants in the exponents are the inverses of discharge circuit time constants.

Speed sampler 32 further comprises a preliminary discharge network 53 including a separate discharge resistor for preliminary of the three capacitors in capacitor circuit 51. To afford a means for emphasizing the time gap between the digital input signals $\bar{A}$ and $\bar{B}$, as discussed above, a compensating discharge network 54 is incorporated in speed sampler 32 and is also connected to capacitor network 51. Network 54 includes additional discharge resistors, one for each of the capacitors in circuit 51, that can be connected to the capacitors to reduce the time constants of their discharge circuits by a factor of 3:1.

To establish the required initial charge on each of the capacitors in capacitor circuit 51, the capacitor circuit is connected to a charge means 55 comprising a regulated voltage supply. The charge means 55 has an input connected to the AC output of timer 34 in logic control unit 31. The preliminary discharge network 53 has a control input connected to the discharge command output AD of discharge toggle 36. The AD output of discharge toggle 36 is also connected to the compensating discharge network 54. An additional input to network 54 is taken from the A output of line receiver 25.

Capacitor circuit 51 is also connected to a sample-and-hold amplifier 56. Amplifier 56 also has two control inputs, one of which is connected to the charge command output AC of timer 34, the other being connected to the discharge command output AD of discharge toggle 36.

The second speed sampler 33 in speed detector 20 is essentially similar in construction to speed sampler 32 except for the controlling input connections from logic control unit 31. Thus, speed sampler 33 comprises a capacitor circuit 61 including three capacitors each connected to a separate discharge resistor in a preliminary discharge network 63. The capacitors in circuit 61 are also each connected to an additional discharge resistor in a compensating discharge network 64. The initial charges on the capacitors in circuit 61 are established by a charge means 65 under the control of a charge command signal derived from the BC output of timer 35 in logic control unit 31. The control input to the preliminary discharge network 63 is taken from the BD output of discharge toggle 37. The BD output of discharge toggle 37 is also connected to the compensating discharge network 64, which has an additional control input connected to the $\overline{B}$ output of line receiver 25.

The output stage of speed sampler 33 comprises a sample-hold amplifier 66, the input to which is taken from capacitor circuit 61. There are two control inputs to amplifier 66, derived from the BC output of timer 35 and from the BD output of discharge toggle 37 in logic control unit 31.

The output stage of speed detector 20 comprises an additional sample-hold amplifier 67 having two signal inputs, one connected to the output of amplifier 56 in smapler 32 and the other connected to the output of amplifier 66 in sampler 33. In addition, there are three control inputs for amplifier 67, one connected to the "select A" output AS of selection toggle 38, another connected to the "select B" output BS of the selection toggle, and the third connected to the output S of storage timer 44. The sample-hold amplifier 67 may be connected to an appropriate indicating device or to a suitable recorder 68. In addition to the connections to the output amplifier 67, the outputs SA and SB of the two speed sampler amplifiers 56 and 66 are connected to separate inputs for crossover detector 45.

Figure 4:
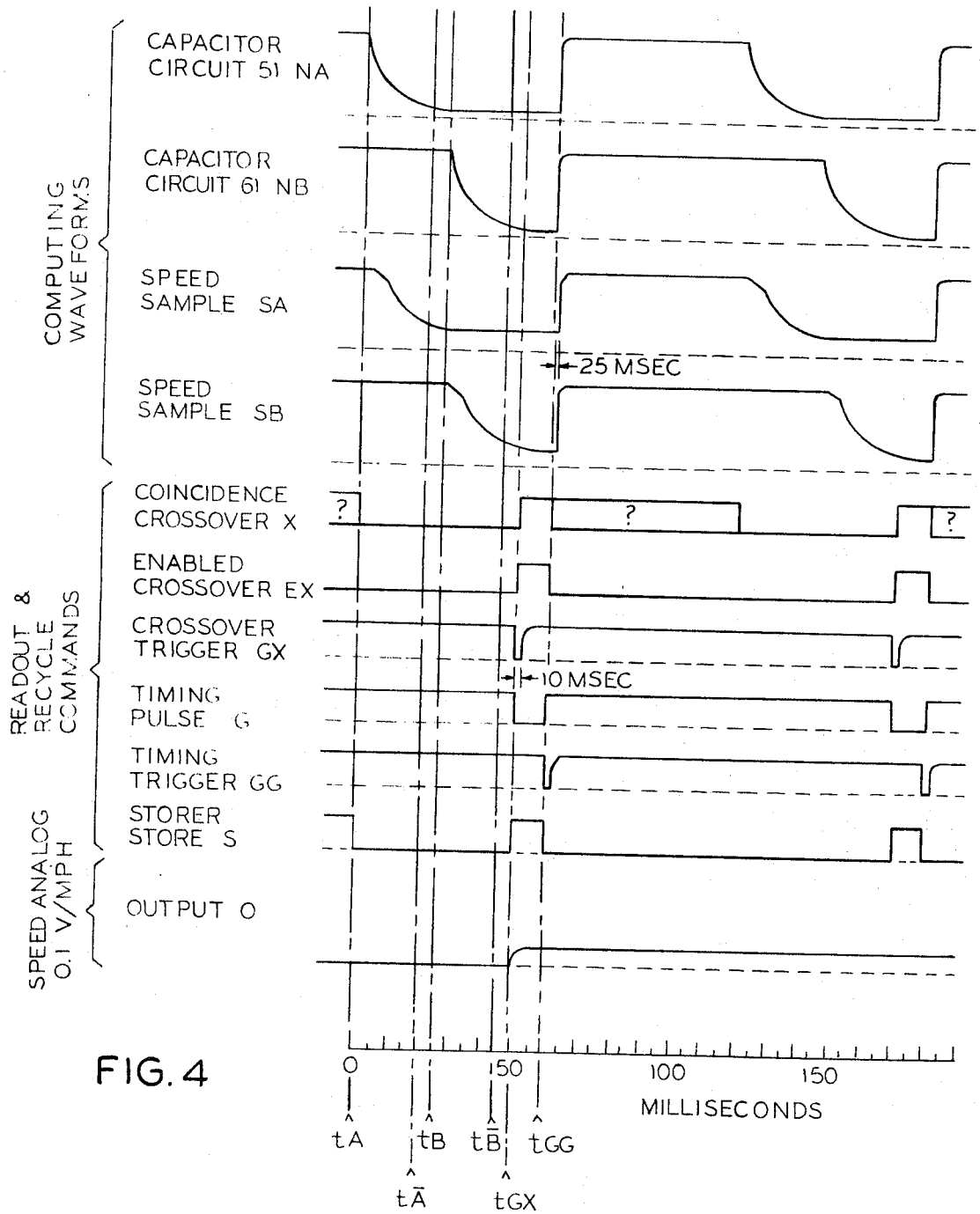

The basic operation of speed detector 29 (FIG. 1) can best be understood by reference to FIGS. 3 and 4, illustrating the timed relationship of the various signals in the speed detector for a given A-B sequence of output signals from sensor 21, corresponding to the signal sequence discussed above in connection with FIGS. 2A-2D. The quiescent status of the various signals is shown by the beginnings of the several signal plots in FIGS. 3 and 4. At the output, before a car wheel moves into the ambit of sensor 21, the AC charge command signal from timer 34 is positive or "true" (FIG. 3) the AC signal is supplied to charge means 55 to actuate the charge means and maintain the capacitors in capacitor circuit 51 in fully charged condition as indicated by the initial portion of the capacitor circuit waveform NA (FIG. 4). Similarly, the charge signal BC from timer 35 is positive or "true" (FIG. 3). This signal actuates charge means 65 to maintain the capacitors in circuit 61 in fully charged condition as indicated by the initial portion of the output waveform NB (FIG. 4) for capacitor circuit 61. At this time, the discharge command signals AD and BD from discharge toggles 36 and 37 (FIG. 3) are negative or "false". The signals AD and BD, applied to the discharge networks 53, 54, 63 and 64, maintain the discharge resistors in those networks effectively disconnected from the capacitors in circuits 51 and 61. The sample-hold amplifiers 56 and 66 in samplers 32 and 33 are operating in the follow mode, with maximum output signals SA and SB (FIG. 4). The sample-hold amplifier 67 is effectively cut off by its control input signals AS and BS (FIG. 3) and S (FIG. 4); its output O is essentially zero (FIG. 4).

At the beginning of the operational sequence, time tA in FIGS. 3 and 4, a wheel 23 enters the field of one coil of sensor 21, initiating a signal pulse in the output of the wheel sensor corresponding to pulse A1 (or pulse A2) in FIG. 2A. When that pulse passes the half-amplitude level, the $\overline{A}$ output of line receiver 25 goes negative or "false" (FIG. 3) and actuates input timer 34. The output of timer 34 flips, and the charge command signal AC goes false (FIG. 3), disconnecting the charge means 55 from capacitor circuit 51 (FIG. 1). At the same time, the other output $\overline{AC}$ from timer 34 goes true, enabling discharge toggle 36. The $\overline{AC}$ signal also sets the selection toggle 38, which previously had been disabled with both inputs $\overline{AC}$ and $\overline{BC}$ false, so that the selection signal AS from selection toggle 38 goes positive or "true" (FIG. 3). Furthermore, with the $\overline{AC}$ signal true, an inhibit signal previously applied to the crossover gate 39 is removed; however, this inhibit signal is immediately replaced by another as described below.

With discharge toggle 36 now enabled by the $\overline{AC}$ signal, the $\overline{A}$ input actuates the toggle. As a consequence, the discharge command signal AD from toggle 36 goes positive (FIG. 3). The $\overline{AD}$ output, which was previously positive, goes negative or "false" and supplies a continuing inhibit signal to crossover gate 39. Cross'ver gate 39 is constructed to afford a short delay to prevent spurious operation during the short time interval that may elapse between the cutoff of the inhibiting signal $\overline{AC}$ and the beginning of the inhibiting signal $\overline{AD}$.

With the discharge command signal AD now true, network 53 is actuated and connects its preliminary discharge resistors to the capacitors in circuit 51, beginning the discharge of those capacitors as indicated by the initial portion of the output signal NA (FIG. 4) of capacitor circuit 51. At this time, the "select A" signal AS from selector toggle 38 has gone true (FIG. 3), connecting the input of sample-hold amplifier 67 to the output SA of amplifier 56 in speed sampler 32 in anticipation of a storage command. However, the $\overline{A}$ signal from line receiver 25, applied to storage timer 44, has also set the storage timer so that the storer store signal S from timer 44 is false (FIG. 4). Amplifier 67 operates in the hold mode and the previously existing stored zero signal in amplifier 67 is retained; the output O of amplifier 67 does not change (FIG. 4).

At the beginning of the operational sequence, time tA, the SA and SB inputs to crossover detector 45 were nominally equal. The crossover detector comprises a simple differential amplifier; consequently, its output signal X has been indeterminate and could have been of either polarity (FIG. 4). Now, however, the output signal SA from amplifier 56 in speed amplifier 32 begins to decay. This change is detected in the crossover detector 45 and the output signal X from the detector quickly goes negative or "false".

All of the foregoing actions, except for the activity associated with crossover gate 39, occur essentially instantaneously at time tA. The status of speed detector 20 is now such that the capacitors in circuit 51 are discharging through preliminary discharge network 53 and amplifier 56 is following the resulting decay in the output signal NA of capacitor circuit 51. Speed sampler 33 is still quiescent; there has been no effective change in its input signals. Input timer 34 and storage timer 44 have both been set and are timing. The decaying output signal SA from amplifier 56 in speed sampler 32 is connected to the sample-hold amplifier 67 but that amplifier is still holding at zero. Furthermore, the output signal EX (FIG. 4) from crossover gate 39 is maintained false.

If no further events should occur (as, for example, if the $\overline{A}$ signal from line receiver 25 were a spurious single pulse) input timer 34 would time out after approximately three seconds and would reset all of the circuits to their original conditions. Furthermore, all of the circuits have been temporarily but immediately locked in so that an initial momentary $\overline{A}$ transient, which can occur in the presence of noise and vibration, has negligible effect on overall system output.

The sample-hold amplifier 56 in the output stage of speed amplifier 32 includes a timed feedback-modification circuit that limits the initial rate of decay of the output signal SA from the amplifier. After a brief time interval, specifically a time interval equal to the measuring interval for a speed of one hundred miles per hour, the maximum speed for the range over which detector 20 operates, the signal SA has fallen to nine volts. At this level, the internal feedback modification circuit uncouples and both the capacitor circuit output signal NA and the amplifier output signal SA are within their respective valid operating ranges.

The next significant event occurs at time $\overline{tA}$. As wheel 23 approaches the center of sensor 21, and moves into the gap between its sensing coils, the output signal from the sensor reduces in amplitude to a point at which the output $\overline{A}$ of line receiver 25 again goes positive. With both signals $\overline{A}$ and AD true, the compensating discharge network 54 is actuated and connects the supplementary discharge resistors in the network to the capacitors in capacitor circuit 51, reducing the discharge time constant for each capacitor by a factor of three. Accordingly, the discharge of the capacitors now proceeds at a faster rate, affording the desired compensation for the time gap between sensor signals as discussed above.

Continuing movement of wheel 23 along its path past sensor 21 (FIG. 1) initiates the next signal pulse B1 (FIG. 2A). When that signal pulse passes the half-amplitude level, the output signal $\overline{B}$ from line receiver 25 switches from true to false (FIG. 3), initiating a chain of events, at time tB, similar to those described above. Thus, the charge command signal BC from input timer 35 goes false and shuts off charge means 65, which has previously maintained capacitor network 61 in fully charged condition. The output signal $\overline{BC}$ from timer 35 conditions discharge toggle 37 for actuation and the discharge toggle is flipped by the $\overline{B}$ signal so that the preliminary discharge command signal BD goes true and the signal $\overline{BD}$ goes false (FIG. 3). The inhibiting input to crossover gate 39, previously supplied by the $\overline{BC}$ output of timer 35, is replaced by the $\overline{BD}$ output of toggle 37. The preliminary discharge network 63 is actuated by the discharge command signal BD from toggle 37, connecting the discharge resistors in the network to the capacitors in circuit 61. Accordingly, the output signal NB from circuit 61 begins to decay in the same manner as described above for signal NA.

At this point, time tB, the input timer 35 and discharge toggle 37 are both set. However, the change of signal $\overline{BC}$ from false to true has no effect on selection toggle 38 because the selection toggle has been preset by the AC signal from timer 34, as described above, and timer 34 has not timed out.

At this point, time tB, because both of the signals $\overline{A}$ and $\overline{AC}$ are true, the change of the input signal $\overline{B}$ to the false state resets discharge toggle 36, so that the preliminary discharge command signal AD again goes false. Both of the preliminary and compensating sets of discharge resistors 53 and 54 in speed sampler 32 are disconnected from capacitor circuit 51. Because the charge command signal AC from input timer 34 is also false, capacitor circuit 51 has no charge or discharge network connected thereto and is in what amounts to a hold state. The holding of the voltage on capacitor circuit 51 is critical for only a very brief time. After a short delay to allow for settling time of amplifier 56, control signals AC and AD actuate amplifier 56 to a hold condition.

The status of speed detector 20 is now such that the A signal channel comprising speed sampler 32 is holding with a steady output signal SA that constitutes a tentative speed measurement. The sample-hold amplifier 67 in the output of the speed detector is still holding at zero level. The capacitor circuit 61 in the B channel comprising speed sampler 33 is discharging.

The next significant event occurs at time $\overline{tB}$ as wheel 23 leaves the field of the second coil in sensor 21 (FIG. 1) and the output signal $\overline{B}$ from line receiver 25 again becomes true (FIG. 3). At this point, the two input signals $\overline{B}$ and BD to the compensating discharge network 64 in sampler 33 are both true, actuating network 64 to connect its compensating discharge resistors to circuit 61. As in the case of speed sampler 32, the rate of discharge is increased 3:1 and all other functions remain unchanged. Both of the output signal pulses from sensor 21 have now come and gone.

During the period immediately following time $\overline{tB}$ speed detector 20 resolves the question of legitimacy of the tentative speed signal SA being held in the output of speed sampler 32. A pulse sequence A-B has occurred. If this signal pulse pair has in fact resulted from the passage of a single wheel progressively over the two coils of sensor 21 from left to right along path 24, then the next signal resulting from intrusion of the next wheel into the field space over the sensor will be an A signal, but the elapsed time will be much longer than the time gap between the A and B signals in the sequence discussed above. Because the train can acelerate or decelerate only at a relatively moderate rate, successive time intervals are at least approximately proportional to distance. The distance a wheel travels between the beginnings of the A and B signals is approximately 10 inches, which is somewhat less than the effective measuring distance for sensor 21 because of the gap compensating factor discussed above. Compared to this distance, the spacing between adjacent wheels on the same truck is at least about six times longer. The spacing between the last wheel on one car and the first wheel on the next is at least approximately ten times the spacing between coils of the sensor. Between trucks on the same car, the spacing is typically 40 times or more. Thus, in the absence of any intervening event, capacitor circuit 61 in speed sampler 33 discharges for a longer time and to a markedly lower value SB than the stored charge SA being held in sample-hold amplifier 56 in speed sampler 32.

On the other hand, an anomaly can occur to cause an $\overline{A}$ signal long before a $\overline{B}$ signal, as in a situation entailing a B-A sequence in which the first $\overline{B}$ signal is missed. In a situation of this kind, sample-hold amplifier 56 ends up holding at a very low voltage. Sample-hold amplifier 66 ends up holding also, but at a much higher value, due to occurrence of the next A signal. With both amplifiers 56 and 66 holding, input timer 34 times out three seconds after the beginning of the first $\overline{A}$ signal and resets speed sampler 32. Subsequently, as the output signal SA from amplifier 56 suddenly becomes high, a crossover effect generates trigger signals in approximately the normal sequence described below and the output sample-hold amplifier 67 is disconnected and returned to zero holding level. When this occurs, the complete computer of speed detector 20 resets.

If the reset triggering sequence that would ordinarily be initiated by timing out of timer 34 does not occur due to some peculiar timing situation, input timer 35 times out three seconds after completion of the $\overline{B}$ signal. This resets speed sampler 33. In either case, speed detector 20 is completely reset and is ready for a new speed measurement.

However, in normal operation sample-hold amplifier 56 is holding signal SA, the tentative speed signal, and the output signal from sample-hold amplifier 66 is decaying with no reason to stop for a relatively long time. The next major events occur at a crossover time tGX. The interval from time tB to time tGX is essentially identical to the interval from time tA to time tB, in the absence of acceleration or deceleration, and is virtually the same in any case. The crossover time tGX is defined as that instant at which the discharge of capacitor circuit 61 reaches a level at which the output signal SB from sample-hold amplifier 66 falls below the level of the output signal SA being held by sample-hold amplifier 56.

The crossover condition defining time tGX is detected by the differential amplifier comprising crossover detector 45, which abruptly switches its output signal X to a positive or true condition. Crossover gate 39 is already in enabled condition, so that its output signal EX switches to true (FIG. 4). As a consequence, trigger generator 41 produces a brief crossover trigger pulse GX. During a following short interval, the charge on capacitor 61 continues to decay and the output signal SB from sample-hold amplifier 66 continues to reduce in amplitude. The output signal SA from sample-hold amplifier 56 remains unchanged, assuring a continuing true output signal X from crossover detector 45.

The trigger signal GX sets pulse timer 42, which generates a timing pulse G (FIG. 4). The timing pulse G resets storage timer 44, which has timed for only a small fraction of its operating cycle, and holds the storage timer reset during duration of the timing pulse G. As a consequence, timer 44 generates a storer store pulse S (FIG. 4) which is supplied to sample-hold amplifier 67. This actuates the sample-hold amplifier, which samples and stores the output signal SA from speed sampler 32 in accordance with the selection command AS.

At the end of timing pulse G, speed detector 20 recycles; it cannot be truly said to reset because a meaningful output is now held in sample-hold amplifier 67. In sequence, trigger generator 43 develops a timing trigger signal GG at time tGG (FIG. 4). The signal GG sets storage timer 44 to terminate the output signal S from the storage timer. Sample-hold amplifier 67 retains the SA signal voltage in storage as an accepted speed indication. The trigger signal GG resets both of the input timers 34 and 35 in logic control unit 31. As a consequence, both of the charge command signals AC and BC return to true, actuating charge means 55 and 65 to charge capacitor networks 51 and 61. The signals $\overline{AC}$ and $\overline{BC}$, from timers 34 and 35 respectively, both go false, resetting discharge toggles 36 and 37 so that both preliminary discharge command signals AB and BD go false, effectively disconnecting discharge networks 53, 54, 63 and 64 from the capacitor circuits with which they are utilized. Since both $\overline{AC}$ and $\overline{BC}$ are now false, selection toggle 38 is disabled and the output signal AS from the selection toggle goes false after a brief delay (signal BS remains false). In addition, the false $\overline{AC}$ and $\overline{BC}$ signals disable crossover gate 39 so that its output signal EX returns to false.

The brief delay in the drop of selection signal AS (FIG. 3) retains the connection between sample-hold amplifier 67 and the output of amplifier 56 until after sampling has been completed and a hold condition is safely established in amplifier 67. Subsequently, both the SA and SB inputs are cut off and no appreciable input voltage is applied to amplifier 67. Amplifier 67 operates to hold the previously sampled signal SA, and applies that signal to recorder 68 or to an indicator or other output device for a substantial period of time.

In the two speed samplers 32 and 33, the change in the logic control commands from control unit 31 has restored both capacitor circuits 51 and 61 to charged condition, as shown by their waveforms NA and NB, FIG. 4. In addition, the sample-hold amplifiers 56 and 66 have each been switched to the sample or follow mode by the input signals AC and AD for amplifier 56 and the input signals BC and BD for the amplifier 66. The switching of amplifier 56 to its follow condition is delayed longer than the time required for the return of the selection signal AS to false, so that the speed sample signal SA persits until after amplifier 56 is disconnected from the input of amplifier 67.

At this point, logic control unit 31 and speed samplers 32 and 33 have been restored to their original quiescent state, whereas sample-hold amplifier 67 retains the speed signal SA for readout. When the next sequence of A-B signals occurs, speed detector 20 repeats the cycle of operation described above and supplies an updated speed sample signal to amplifier 67 to replace the previously stored signal value. The last stored signal in amplifier 67, from the last wheel of a series, is retained for a substantial period, until timer 44 finally times out. At that time, the storer store signal S switches to true and remains true indefinitely. Amplifier 67 follows its input, which is now zero, and the readout to recorder 68 is discontinued.

Figure 5:
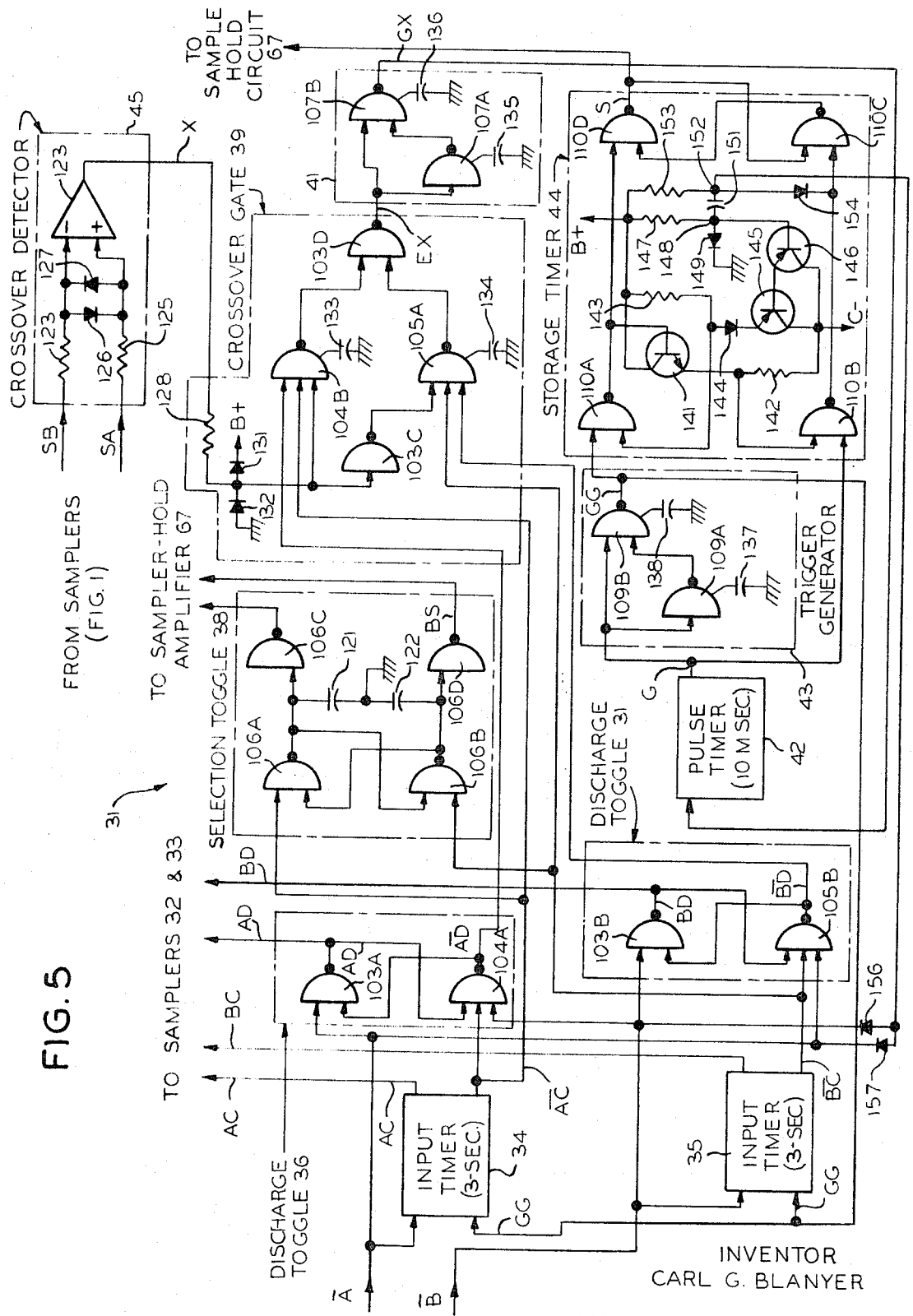
FIG. 5 is a combined logic and schematic diagram of the logic control portion of the speed detector of FIG. 1.

FIG. 5 affords a detailed schematic and logic diagram of a preferred construction for logic control unit 31 (FIG. 1). As shown in FIG. 5, discharge toggle 36 comprises two inverting AND gates 103A and 104A. Gate 103A has one input connected to the $\overline{A}$ output of line receiver 25 and has a second input connected to the $\overline{AD}$ output of gate 104A. Gate 104A has one input connected to the $\overline{AC}$ output of input timer 34 and a second input connected to the $\overline{AD}$ output of gate 103A. A third input to gate 104A is taken from the $\overline{B}$ output of line receiver 25. It is thus seen that discharge toggle 36 comprises a substantially conventional flip-flop circuit that can be set to produce a positive-going (true) output signal at the AD output by a negative-going (false) $\overline{A}$ input signal, with the $\overline{AD}$ output going false. Discharge toggle 36 is reset to afford a false AD output and a true $\overline{AD}$ by a combination of negative-going inputs $\overline{AC}$ and $\overline{B}$ to gate 104A.

Discharge toggle 37 corresponds in construction to toggle 36 and includes two inverting AND gates 103B and 105B connected together in a flip-flop arrangement with a $\overline{B}$ signal input to gate 103B and $\overline{BC}$ and $\overline{A}$ inputs to gate 105B.

Selection toggle 38 includes four inverting AND gates 106A, 106B, 106C and 106D, all part of a single integrated circuit. The output of each of the gates 106A and 106B is connected to one input of the other. Gate 106A has an external input taken from the $\overline{AC}$ output of timer 34, whereas gate 106B has an external input connection to the $\overline{BC}$ output of timer 35. The output of gate 106A is connected to a capacitor 121 that is returned to ground and is also connected to the input of gate 106C. Similarly, the output of gate 106B is connected to a capacitor 122 that is returned to ground and is also connected to the input of gate 106D. Gate 106C affords the selection command output AS. Gate 106D provides the selection command output BS that is utilized when the sequence of input signals is B-A in contrast with the A-B sequence described in detail above.

Figure 6:
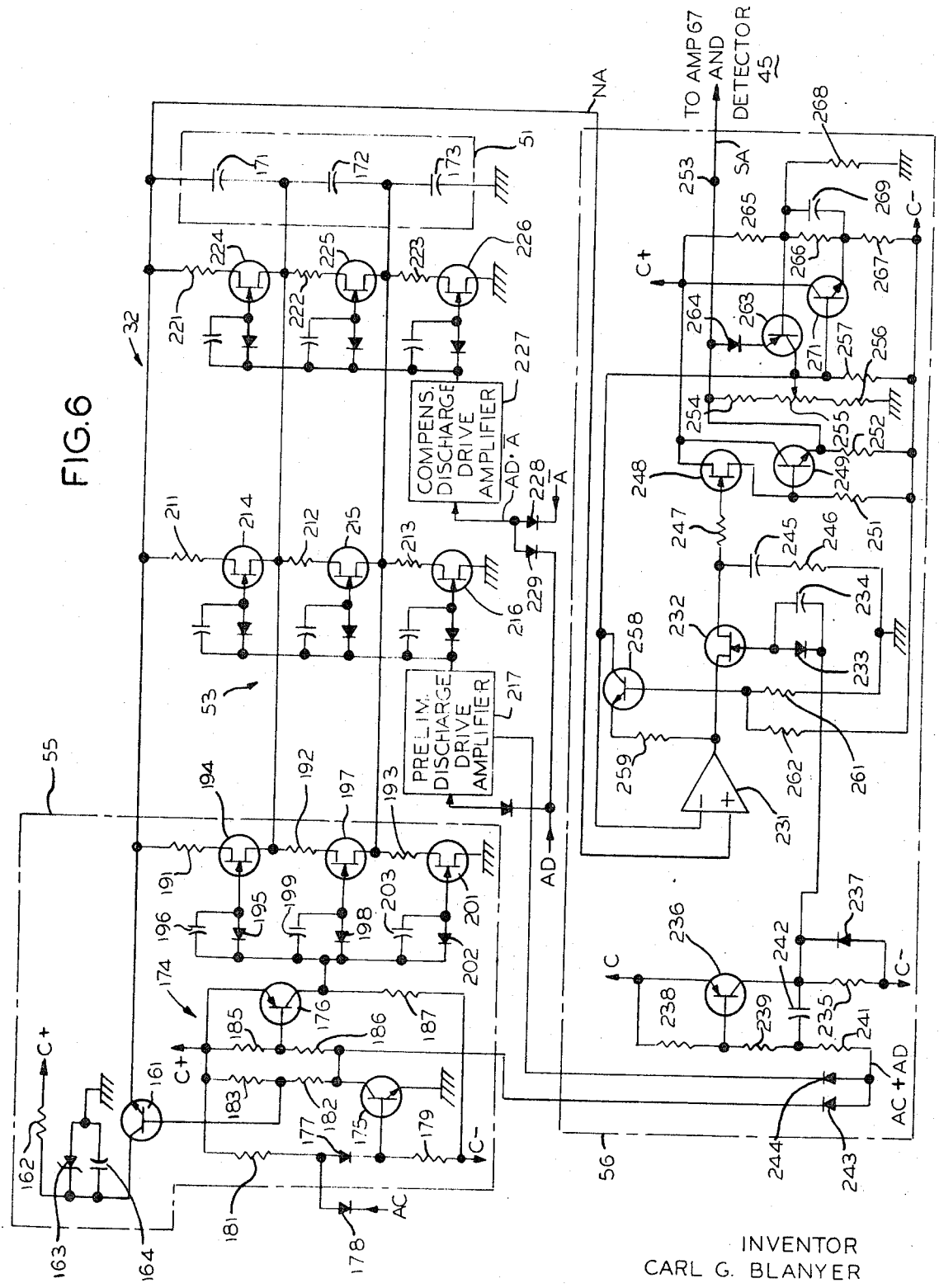
FIG. 6 is a detailed circuit diagram of one of two speed sampler units incorporated in the speed detector of FIG. 1.

Cross-over detector 45, in the specific circuit illustrated in FIG. 5, comprises an operational amplifier 123 having its inverting input connected through a resistor 124 to the SB output of speed sampler 33 (FIG. 1). The non-inverting input of operational amplifier 123 is connected through a resistor 125 to the SA output of speed sampler 32 (FIGS. 1 and 6). A pair of diodes 126 and 127 are connected across the inputs to operational amplifier 123 in parallel with each other and in reversed polarity.

Crossover gate 39, as shown in FIG. 5, comprises four integrated circuit inverting AND gates 103C, 103D, 104B and 105A. Gate 104B has three inputs, one connected to the $\overline{AD}$ output of toggle 36, another connected to the $\overline{AC}$ output of timer 34, and a third connected through a resistor 128 to the X output of operational amplifier 123 in crossover detector 45. A clamp circuit comprising a diode 131 connected to a B+ supply and a diode 132 returned to ground are provided on the X input circuit to gate 39. This same circuit affords the only input to gate 103C, which serves only as an inverter. A small delay capacitor 133 is connected to gate 104B and returned to ground.

The connections to gate 105A are similar to those for gate 104B. Gate 105A has three inputs, one connected to the $\overline{BC}$ output of timer 35 and another connected to the $\overline{BD}$ output of discharge toggle 37. The third input to gate 105A is taken from the output of gate 103C. A small delay capacitor 134 is connected to gate 105A and is returned to ground. The outputs of gates 104B and 105A are connected to the inputs of gate 103D, the output of gate 103D constituting the EX output of crossover gate 39.

Trigger generator 41, in the specific construction shown in FIG. 5, comprises two inverting integrated circuit gates 107A and 107B. The EX output of crossover gate 39 is connected to the input of gate 107A and to one input of gate 107B. The output of gate 107A is connected to a second input for gate 107B. A small timing capacitor 135 is connected to gate 107A and returned to ground and a small timing capacitor 136 is connected to gate 107B and returned to ground. The output of gate 107B constitutes the GX output of trigger generator 41.

Trigger generator 43 corresponds in construction to trigger generator 41 and comprises two integrated circuit gates 109A and 109B, each having an input connected to the G output of pulse timer 42 with the output of gate 109A connected to a second input for gate 109B. A timing capacitor 137 is connected from gate 109A to ground and a timing capacitor 138 is connected from gate 109B to ground. The output of gate 109B constitutes the GG output of trigger generator 43.

Storage timer 44, shown in detail in FIG. 5, is also typical of the construction employed for timers 34, 35 and 42. Timer 44 comprises four inverting AND gates 110A through 110D, each having two inputs and a single output. Gate 110A has one input connected to the GG output of trigger generator 43. The output of gate 110A is connected to one input of gate 110D. Gate 110D has an input connection from the G output of pulse timer 42 and the output of gate 110B is connected to one input of gate 110C. The output of each of gates 110C and 110D is connected to a second input for the other in a conventioanl flip-flop arrangement. The S output of storage timer 44 is derived from the output of gate 110D. Where two outputs are required from the timer, as in timers 34 and 35, an inverse output can be derived from the output of gate 110C.

The output of gate 110A, in timer 44, is also connected to the base of a gate transistor 141. The collector of transistor 141 is connected to a low voltage DC supply designated as B+. The emitter of transistor 41 is connected to one input of gate 110B and is also returned to a negative DC supply C− through a resistor 142.

The second input to gate 110A in timer 44 is connected to a resistor 143 that is returned to the B+ supply and is also connected through a diode 144 to the emitter of transistor 145. The collector of transistor 145 is connected to the C− supply. The base of transistor 145 is connected to the emitter of another transistor 146. Transistors 145 and 146 serve as power amplifiers. The collector of transistor 146 is connected to the C− supply and the base of transistor 146 is connected to a resistor 147 that is in turn connected to the B+ supply. The common terminal 148 of the transistor 147 and the base of transistor 146 is returned to ground through a diode 149. Terminal 148 is also coupled by a capacitor 151 to an input terminal 152. Terminal 152 is connected to a resistor 153 that is returned to ground and is also connected to a diode 154 that is in turn connected to the output of gate 110B. Terminal 152 is connected, through an OR circuit comprising two diodes 156 and 157, to the $\overline{B}$ and $\overline{A}$ outputs, respectively, of line receiver 25.

The operation of most of the circuits in logic control unit 31 will be self-apparent from the drawing and from the general operational description set forth above. Thus, toggles 36 and 37 operate as conventional flip-flop circuits. Toggle 36 is set by the $\overline{A}$ signal when that signal goes false and is reset when the $\overline{AC}$ signal is true and the $\overline{B}$ signal false. Toggle 37 operates in the same manner. The outputs AS and BS of selection toggle 38 are both normally false. A true $\overline{AC}$ input to gate 106A produces a true output signal AS from gate 106C, which remains true even though the $\overline{BC}$ signal may subsequently go true. Similarly, for a reverse sequence of car movement, a true $\overline{BC}$ signal supplied to gate 106B in toggle 38 produces a true output signal BS that remains true even though the $\overline{AC}$ signal may subsequently go true.

Crossover gate 39 normally produces an output signal EX that is false. The crossover gate is triggered when the three input signals to gate 104B are all true or when the three input signals to gate 105A are all true; it should be noted that the two conditions are mutually exclusive because of the inversion of the crossover detector signal X in gate 103C. Trigger circuits 41 and 43 simply provide short distinct pulse signals for actuation of timers 42 and 44.

Timer 44, and the other timers that are constructed along the same lines, is essentially similar in operational characteristics to a monostable multivibrator of conventional construction, but with some modifications to assure positive action when the timer has timed out. The circuit comprising transistor 141 is incorporated in the timer primarily to assure actuation of gate 110D before gate 110C is actuated, affording a natural and consistent toggle action. The basic timing is determined by capacitor 151 and its principal discharge resistor 147. Capacitor 151 is normally charged to the B+ voltage, which in this instance is 5 volts. A GG set signal supplied to gate 110A initiates discharge of capacitor 151, primarily through resistor 147. Transistors 145 and 146 comprise a power amplifier. As capacitor 151 is discharged, the base of transistor 146 is driven negative and the conductivity of the two transistors 145 and 146 increases. As a consequence, the input to gate 110A that is connected to the emitter of transistor 145 is driven negative, maintaining gate 110A in its off condition until capacitor 151 is discharged. When the charge on capacitor 151 is substantially completely dissipated, the timer reverts to its initial operating condition; the output signal S from gate 110D, which has been negative (false) during the discharge of capacitor 151, again goes positive (true) (FIG. 4). This timer circuit affords positive control of discharge time intervals over a wide time range, so that the same circuit, with different values for capacitor 151, can be utilized for the quite different time requirements of all of the timers in the logic unit. On reset, capacitor 151 is charged very rapidly and is ready for a further operation almost instantaneously.

FIG. 6 illustrates a particular circuit that may be utilized for speed sampler 32 in the speed detector 20 of FIG. 1. As shown in FIG. 6, the charge means 55 comprises a gate transistor 161 having its emitter connected to the C+ supply through a resistor 162. A zener diode 163 is connected from the emitter of transistor 161 to ground and a capacitor 164 is connected in parallel with the diode, affording a regulated supply connected to transistor 161. The collector for transistor 161 is connected to the first capacitor 171 of three series-connected capacitors 171, 172 and 173 constituting the capacitor circuit 51; the third capacitor 173 is returned to system ground.

The input signal to transistor 161 is derived from a drive amplifier 174 that includes an input transistor 175 and an output transistor 176. The base of transistor 175 is connected to a diode 177 that is incorporated in a simple AND circuit with a diode 178, diode 178 in turn being connected to the AC output of timer 34 (FIGS. 1 and 5). The base of transistor 175 is also connected to a resistor 179 that is returned to the C− supply. The anodes of the two diodes 177 and 178 are connected to a resistor 181 that is in turn connected to the C+ supply.

The emitter of transistor 175 is connected to system ground. The collector is connected to a voltage divider comprising two series resistors 182 and 183 with the resistor 183 connected to the C+ supply. The common terminal of resistors 182 and 183 is connected to the base of gate transistor 161.

The base of transistor 176 is connected to a resistor 185 that is connected to the C+ supply and to a resistor 186 that is connected to the collector of the input transistor 175. An auxiliary output is derived from the collector of transistor 175, in a connection to the sample-hold amplifier 56 as described more fully hereinafter. The emitter of transistor 176 is connected to the C+ supply and the collector is connected to a load resistor 187 that is returned to the C− supply.

The charge means 55 further comprises three charge resistors 191, 192 and 193 that are connected in parallel with the capacitors 171, 172 and 173 respectively. A field effect transistor 194 is connected in series with the initial charge resistor 191, the gate electrode of the FET 194 being connected through a diode 195 to the collector of the output transistor 176 of amplifier 174. A capacitor 196 is connected in parallel with diode 195. Similarly, a field effect transistor 197 is connected in series with the second charge resistor 192, the gate electrode of the FET 197 being connected to the collector of transistor 176 through the parallel combination of a diode 198 and a capacitor 199. A third field effect transistor 201 is connected in series between the third charging resistor 193 and system ground. The gate electrode of the FET 201 is connected to the collector of transistor 176 through the parallel combination of a diode 202 and a capacitor 203.

The preliminary discharge network 53 is essentially similar in construction to charge means 55 except that there is no connection to an external power supply for charging capacitors 171–173. Thus, the preliminary discharge network 53 comprises three discharge resistors 211, 212 and 213 connected in parallel with the three capacitors 171, 172 and 173 respectively. A field effect transistor 214 is connected in series with the initial discharge resistor 211, a field effect transistor 215 is connected in series with discharge resistor 212, and a field effect transistor 216 is connected in series with discharge resistor 213. The gate electrodes of the three FETs 214, 215 and 216 are connected to a preliminary discharge drive amplifier 217, through suitable diode-capacitor gate circuits. The preliminary discharge drive amplifier 217 may be of the same construction as the charge drive amplifier 174, and hence has not been shown in detail. The input to drive amplifier 216 is taken from the AD output of discharge toggle 36 (FIGS. 1 and 5).

The compensating discharge network 54, in the specific form illustrated in FIG. 6, is essentially similar in construction to charge means 55 and discharge network 53. Network 54 comprises three individual discharge resistors 221, 222 and 223 connected in parallel with capacitors 171, 172 and 173 respectively. A field effect transistor 224 is connected in series with resistor 221, a field effect transistor 225 is connected in series with resistor 222, and a field effect transistor 226 is connected in series with resistor 223. The gate electrodes of the three FETs are connected to a drive amplifier 227 by suitable parallel diode-capacitor circuits. Amplifier 227 may correspond in construction to amplifier 174, except that the input to amplifier 227 comprises a pair of diodes 228 and 229 so that the actuating signal for amplifier 227 is of the form AD · $\overline{A}$.

The sample-hold amplifier 56, as illustrated in FIG. 6, may comprise an operational amplifier 231 having its non-inverting input connected to the capacitor 171 in capacitor circuit 51. The output of amplifier 231 is connected to the source electrode of a field effect transistor 232. The gate electrode of FET 232 is connected through the parallel combination of a diode 233 and a capacitor 234 to a resistor 235 having one terminal connected to the C– supply and the other terminal connected to the collector of a transistor 236. A diode 237 is connected in parallel with resistor 235.

The emitter of transistor 236 is connected to the C+ supply; the base is connected to a resistor 238 that is returned to the C+ supply. The base of transistor 236 is also connected to a resistor 239 in turn connected to a resistor 241. A capacitor 242 is connected from the common terminal of resistors 239 and 241 to the collector of transistor 236. Resistor 241 is a part of an OR gate that includes two diodes 243 and 244. Diode 243 is connected to the collector of transistor 175 in the drive amplifier 174 of charge means 55. Diode 243 is similarly connected to drive amplifier 217 in the preliminary discharge network 53. Thus, the signal supplied to the base of transistor 236 is of the form AC+AD.

The drain electrode of FET 232 is connected to a main storage capacitor 245 that is returned to ground through a small resistor 246. The output electrode of FET 232 is also connected through a resistor 247 to the gate electrode of another field effect transistor 248. The drain electrode of FET 248 is connected to the C+ supply. The source electrode is connected to the base of a transistor 249 and is also connected to the C– supply through a resistor 251.

Transistor 249 is connected in an emitter follower configuration; the collector is connected to the C+ supply and the emitter is returned to the C– supply through a load resistor 252. The emitter of transistor 249 is also connected to the output terminal 253 of amplifier 56 and to a voltage divider comprising three series-connected resistors 254, 255 and 256, resistor 256 being returned to ground. Resistor 255 is a calibrating potentiometer; the tap of the potentiometer is connected to a resistor 257 that is returned to the C– supply. The tap on potentiometer 255 is also connected in a feedback circuit that is returned to the inverting input of operational amplifier 231. The feedback circuit from the potentiometer tap is further connected to the collector of a transistor 258. The emitter of transistor 258 is connected to a resistor 259 that is connected to the output terminal of operational amplifier 231. The base of transistor 258 is connected to ground through a resistor 261 and to the C– supply through a resistor 262.

The tap on potentiometer 255 is also connected to the collector of a transistor 263. The emitter of transistor 263 is connected through a blocking diode 264 to the SA output terminal 253 of amplifier 56. The base of transistor 263 is connected to a resistor 265 that is returned to the C+ supply. The base of transistor 263 is also connected to the series combination of two resistors 266 and 267, resistor 267 being returned to the C– supply. The common terminal of resistors 265 and 266 is connected to a resistor 268 that is returned to ground and a capacitor 269 is connected in parallel with resistor 266.

The tap on potentiometer 255 is also connected to the base of a transistor 271. The collector of transistor 271 is connected to the C+ supply and the emitter is connected to the common terminal of resistors 266 and 267.

When the speed detector is in its quiescent state, a positive-polarity AC signal is supplied to amplifier 174 through a diode 178. This signal is amplified in the circuit comprising transistor 175 and is applied to the base of transistor 161 to maintain transistor 161 in conductive condition. This effectively connects the regulated voltage supply 162–164 to capacitor 171 in circuit 51. The AC signal is also applied, from transistor 175, to the base of transistor 185 to apply a gating signal to the three FETs 194, 197 and 201 of charge means 55 so that all three FETs are maintained conductive. Accordingly, complete charging paths are established for the three capacitors 171, 172 and 173 and the capacitors are charged to initial voltages determined primarily by the relative resistances of resistors 191, 192 and 193.

At time $\overline{tA}$, when the AC signal goes false and the AD signal goes true (FIG. 3), FETs 194, 197 and 201 are switched non-conductive and FETs 214, 215 and 216 are gated conductive. It is thus seen that the resistors 211, 212 and 213 in the preliminary discharge network 53 provide the basic discharge paths for capacitors 171, 172 and 173, through which discharge is commenced when the input signal $\overline{A}$ goes false. When the input signal $\overline{A}$ again goes true, at time $tA$, the input signal AD·$\overline{A}$ to amplifier 227 actuates the amplifier to gate the FETs 224, 225 and 226 to conductive condition, connecting resistors 221, 222 and 223 in parallel with resistors 211, 212 and 213 respectively, thus reducing the time constants for the discharge circuits for capacitors 171, 172 and 173 for compensation purposes as set forth above.

Capacitors 171, 172 and 173 are chosen with standard values in approximate inverse proportion to their required initial charge voltages. The re-charge operation from the voltage supply 162–164 through gate transistor 161 is very rapid compared to the time constants involved in the discharge circuits because the voltage applied abruptly to the three series-connected capacitors through transistor 161 immediately distributes itself among the capacitors with equal charges on each and hence with nearly the correct charge-voltage ratios. Resistors 191, 192 and 193 then effect the small final redistribution of initial voltages quite quickly. This ratio of capacitor sizes also results in roughly similar values for the three discharge resistors in each of the circuits 53 and 54 and avoids inconveniently large and small values. Relatively precise resistor values are desirable, particularly for the resistors used to charge and discharge capacitor 171.

The initial total charge voltage on capacitor circuit 51 is selected to be well within the linear operating range of the following amplifier, particularly operational amplifier 231. Using a type 741 operational amplifier, the initial charge voltage may be selected as ten volts. With an effective measuring distance for a typical sensor of 11.5 inches, the basic measurement function becomes:

$$F_2(t) = 7.85e^{-t/4.186} + 1.82e^{-t/21.93} + 0.3e^{-t/142} + 0.033.$$

The nominal scale factor is 33 millivolts per mile per hour. The upper speed limit for this specific circuit arrangement is slightly above 100 miles per hour and the corresponding voltage is 3.3 volts. The initial decay in the capacitor network charge NA from 10 volts to 3.3 volts is essentially meaningless and unusuable because the discharge function departs more and more from the ideal $K/t$ function as the time interval approaches zero.

The following amplifier 56 must disturb the capacitor network 51 only negligibly under all conditions. Sufficient gain can be included, however, to raise the scale factor to a more comfortable level; for the illustrated circuit, using the values set forth hereinafter, the scale factor becomes 0.09 volts per mile per hour. This is accomplished by the use of a variable amplified feedback that decreases the gain to a level well below unity for input voltages above 3.3 volts; the output voltage SA varies between 9 and 10 volts as the input NA varies between 3.3 and 10 volts, while the input impedance remains very high. The potentiometer 255 provides an effective gain adjustment in the feedback circuit of amplifier 56 and permits exact calibration in the field. Since the adjustment in speed sampler 32 is independent of the corresponding adjustment in speed sampler 33, the two signal channels can be adjusted to compensate for any asymmetry in the output of sensor 21 for the two directions of travel of a wheel passing the sensor. Preferably, the adjustment potentiometer 255 is itself calibrated to minimize repetition of trails in the field.

The input conductance and bias current of a relatively inexpensive operational amplifier, such as a type 741 amplifier, are adequately low during the charge and discharge operations of speed sampler 32. During the hold function, however, which may persist for as long as 0.6 second for slow traffic, only an expensive specialized operational amplifier would be satisfactory, with respect to the bias current requirements, if no compensation were provided. In the circuit shown in FIG. 6, this difficulty is circumvented by inclusion of a separate hold function so that the amplifier functions on a sample-and-hold basis. Actually, this might be referred to as a follow-and-hold function, because the sample is extensive and is not taken on the fly. The common circuit comprising the FET buffer 248 after the holding capacitor 245 is arranged so that troublesome voltage offset and drift in the FET 248 are regularly and automatically corrected.

The actual capacitor network voltage NA may drift slightly during hold, and this drift may carry the voltage below the positive network voltage for operational amplifier 231. This could cause the output of operational amplifier 231 to shift sharply negative, with a consequent tendency to remove the cut-off bias from the FET sampling switch 232. This action is prevented by the negative limiter comprising transistor 258, which varies the feedback voltage slightly when necessary to permit only small negative excursions without appreciable disturbance of the output or the input. The small constant term at the end of the discharge function, as set forth above, is determined by the impedance of the bias resistance 257. The determination of the reduction of the output signal to the effective operating level of 9 volts is effected by the portion of the circuit comprising transistors 263 and 271. Transistor 271 functions as an amplifier driving transistor 263 to effect the requisite transition. Transistor 271 compares the feedback voltage from resistor 257 with its own bias voltage in making the necessary determination.

In the switching of the FETs that control the charge and discharge resistors for capacitors 171-173, the abrupt application of a positive-going signal to the FET gate could fail to actuate the FET to conductivity, due to the presence of stray capacitances in the circuit. This is prevented by the additional gate circuit capacitors such as capacitors 196, 199 and 203. These capacitors could create some disturbance in the precision circuitry, but this effect is minimized by utilization of extremely small capacitors.

The described summing arrangement for the three capacitors of circuit 51 is quite advantageous, particularly because it is a simple matter to charge all three capacitors rapidly and simultaneously. Furthermore, the discharge rates for the three capacitors are variable on an individual basis, since the resistors in the discharge paths for one capacitor do not affect the other capacitors.

Figure 7:
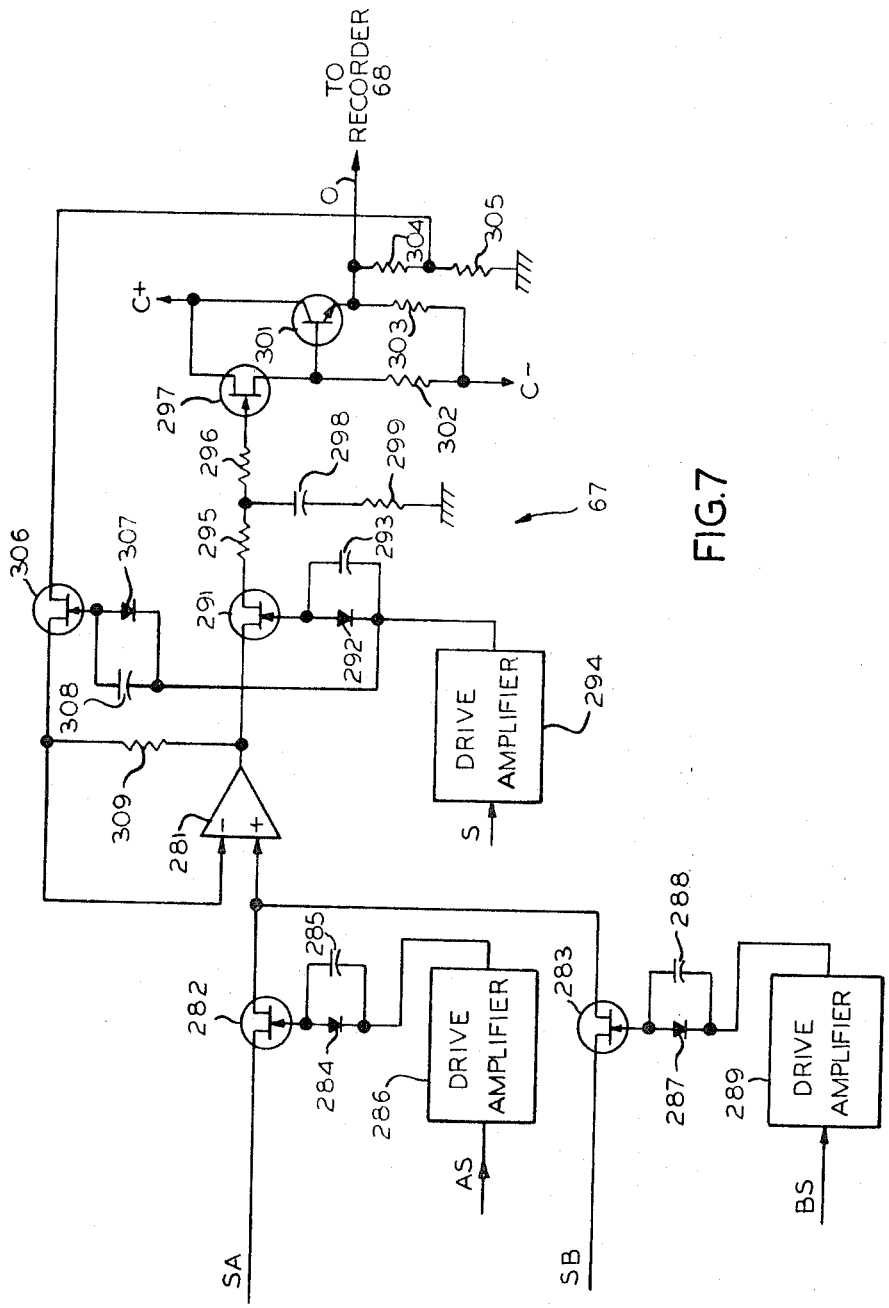
FIG. 7 is a schematic diagram of the output circuit for the speed detector of FIG. 1.

FIG. 7 illustrates a specific circuit arrangement that may be utilized for the sample-hold output amplifier 67 in speed detector 20. As shown therein, amplifier 67 comprises an operational amplifier 281 having its non-inverting input connected to the drain electrode of each of two field effect transistors 282 and 283. The source electrode of FET 282 is connected to the SA output of the A signal speed sampler 32 (FIGS. 1 and 6). The source electrode of FET 283 is connected to the SB output of the B signal speed sampler 33 (FIG. 1).

The gate electrode of FET 282 is connected, through the parallel combination of a diode 284 and a capacitor 285, to the output of a drive amplifier 286. Amplifier 286 may be essentially similar in construction to amplifier 174 (FIG. 6) and hence has not been shown in detail. The input of drive amplifier 286 is derived from the AS output of logic control unit 31 and specifically from selection toggle 38 in the logic control unit (FIGS. 1 and 5). The gate electrode of transistor 283 is connected through the parallel combination of a diode 287 and a capacitor 288 to the output of a drive amplifier 289. Amplifier 289 has its input connected to the BS output of selection toggle 38 in logic control unit 31, (FIG. 1).

The output of operational amplifier 281 is connected to the source electrode of a field effect transistor 291. The gate electrode of FET 291 is connected, through the parallel combination of a diode 292 and a capacitor 293, to the output of a drive amplifier 294. Drive amplifier 294 may correspond in construction to amplifier 174 (FIG. 6). The input to drive amplifier 294 is taken from the S output of storage timer 44 (FIGS. 1 and 5).

The drain electrode of transistor 291 is connected, through the series combination of two resistors 295 and 296, to the gate electrode of a field effect transistor 297. The common termainl of resistors 295 and 296 is connected to a storage capacitor 298 which is returned to ground through a small resistor 299. The drain electrode of transistor 297 is connected to the C+ supply. The source electrode is connected to the base of a transistor 301 and to a resistor 302 that is returned to the C− supply.

Transistors 297 and 301 together form a buffer amplifier stage in the output of the sample-hold amplifier 67. The collector of transistor 301 is connected to the C+ supply. The emitter is connected to a load resistor 303 that is returned to the C− supply. The emitter of transistor 301 is also connected to recorder 68 (FIG. 1), and constitutes the output terminal for the output signal 0 (FIG. 4). The emitter of transistor 301 is also connected to a voltage divider comprising two series connected resistors 304 and 305, resistor 305 being returned to ground. The common terminal of resistors 304 and 305 is connected in a feedback circuit that is returned to the inverting input of operational amplifier 281.

The feedback circuit for operational amplifier 281 includes a field effect transistor 306 having an output electrode connected to the inverting input of operational amplifier 281. The input electrode of transistor 306 is connected to the common terminal of resistors 304 and 305. The gate of transistor 306 is connected, through the parallel combination of a diode 307 and a capacitor 308, to the output of drive amplifier 294. A large resistor 309 is connected from the output terminal of amplifier 281 to its inverting input terminal.

The sample-hold output amplifier 67 is generally similar in construction to the sample-hold amplifier 56 (FIG. 6), except that the calibration portion of amplifier 56 is omitted and the feedback circuit is changed somewhat. When amplifier 67 is in its follow mode of operation, as controlled by the timer signal S supplied to drive amplifier 294, the FET 291 is maintained conductive and capacitor 298 is charged to a voltage determined by the input signal to operational amplifier 281. Initially, essentially zero charge is maintained on capacitor 298 because the two FET switches 282 and 283 in the input to operational amplifier 281 are maintained cut off pending verification of a speed sample in the output of either speed sampler 32 or speed sampler 33 as described above.

When a tentative speed sample from one of the sampler circuits has been accepted, the FET switch in either the SA or SB input to amplifier 67 is driven conductive in response to an AS or BS signal to one of the drive amplifiers 286 and 289. The speed sample voltage is used to charge storage capacitor 298, through operational amplifier 281 and FET 291. Subsequently, with circuit 67 in its hold mode of operation, the feedback circuits of the amplifier maintain a substantially constant output determined by the charge on capacitor 298. The duration of the hold mode of operation for circuit 67 is determined by the timer signal S and its control drive amplifier 294. The overall gain of amplifier 67 is approximately 1.1, so that the output of the amplifier has a scale factor of 0.1 volts per mile per hour, a practical working value for driving recorder 68 or other output indicator apparatus. The modified feedback circuit in sample-hold circuit 67 affords improved prevention of negative excursions of the amplifier output, and also assures maintenance of the amplifier output near the correct value just before sampling is initiated, reducing output transients at the instant of sampling.

The specific circuit data set forth hereinafter are presented solely in order to afford a more explicit example of the invention and in no sense as a limitation on the invention.

Integrated Circuits and Other Semiconductor Devices

| | |
|---|---|
| 103A, B, C, D | Type 846 |
| 104A, B | 832 |
| 105A, B | 832 |
| 106A, B, C, D | 846 |
| 107A, B | 832 |
| 109A, B | 832 |
| 110A, B, C D | 846 |
| 123, 231, 281 | 741 |
| Diodes, except as noted | 1N4446 |
| 163 | 1N5240B |
| NPN transistors | 2N3904 |
| PNP transistors | 2N3906 |
| FET transistors (except as noted) | 2N5653 |
| 248, 297 | 2N5458 |

Resistors

| | |
|---|---|
| 142, 128 | 2.7 kilohms |
| 143 | 27 kilohms |
| 147 | 510 kilohms |
| 153 | 2.2 kilohms |
| 124, 125, 182, 251, 302 | 10 kilohms |
| 162 | 270 ohms |
| 179 | 150 kilohms |
| 181 | 56 kilohms |
| 183 | 22 kilohms |
| 185, 238 | 6.8 kilohms |
| 186, 239 | 47 kilohms |
| 187, 235 | 18 kilohms |
| 191 | 10 kilohms |
| 192 | 2.92 kilohms |
| 193 | 332 ohms |
| 211 | 10.73 kilohms |
| 212 | 14.7 kilohms |
| 213 | 14.3 kilohms |
| 221 | 5.37 kilohms |
| 222 | 7.32 kilohms |
| 223 | 7.15 kilohms |
| 241, 265 | 4.7 kilohms |
| 246 | 47 ohms |
| 247, 304, 295, 296 | 1 kilohm |
| 252, 267 | 15 kilohms |
| 254 | 7.50 kilohms |
| 255 | 2 kilohms |
| 256 | 4.02 kilohms |
| 266 | 20 kilohms |
| 268 | 8.2 kilohms |
| 259, 303 | 3.3 kilohms |
| 261 | 3 kilohms |
| 262 | 12 kilohms |
| 299 | 15 ohms |
| 305 | 9.1 kilohms |
| 309 | 1 megohm |

Capacitors

| | |
|---|---|
| 121, 122, 135, 137 | 0.01 microfarad |
| 133, 134 | 0.001 microfarad |
| 136, 138 | 330 picofarad |
| 151 | 180 microfarads |
| 164 | 100 microfarads |
| 196, 199, 203 | 10 picofarads |
| 171 | 0.39 microfarads |
| 172 | 1.50 microfarads |
| 173 | 10.0 microfarads |
| 245 | 0.1 microfarads |
| 269 | 270 picofarads |
| 298 | 1.0 microfarad |

The speed detection method and apparatus of the invention afford accurate (± ½ percent maximum speed) measurements even with the "elastic ruler" input afforded by sensor 21. The conversion from time measurement to speed indication is effected by a relatively simple analog technique that avoids direct multiplication or division. The direction of movement of the railway vehicle or other object is ascertained consistently.

Speed data is preserved for an interval adequate for operator control purposes. Nevertheless, the speed detector is compact in size, relatively inexpensive, and well suited to use under rugged service conditions.

I claim:

1. The method of detecting the speed of an object moving along a given path past a sensor which develops two electrical signals, each enduring for a time interval that varies inversely with the speed of the moving object and that also varies as an inverse function of the distance between the object and the sensor, said signals being spaced by a time gap that varies inversely with the speed of the moving object and that also varies as a function of the distance between the object and the sensor, said method comprising the following steps:
  A. maintaining a capacitor circuit in an initial charge condition before initiation of said signals;
  B. initiating a change in the charge condition of said capacitor circuit through a first network having a given time constant upon initiation of the first of said signals;
  C. continuing said change in the charge condition of said capacitor circuit through a modified network having a substantially different time constant upon expiration of the first signal; and
  D. interrupting the change in charge condition of said capacitor circuit upon initiation of the second signal, the residual charge on the capacitor circuit being indicative of the speed of the object.

2. The method of detecting the speed of a moving object, according to claim 1, in which said capacitor circuit is charged to a given initial voltage in step A, discharged at a first rate determined by said given time constant in step B, and discharged at a substantially faster rate determined by said different time constant in step C.

3. The method of detecting the speed of a moving object, according to claim 1, including the further steps of modifying the charge on an additional storage capacitor in accordance with the terminal charge condition of said capacitor circuit at step D, and subsequently holding the charge on the additional storage capacitor, independently of changes in charge condition of said capacitor circuit.

4. The method of detecting the speed of a moving object, according to claim 3, including the further step of restoring said capacitor circuit ot its initial charge condition, after step D and after holding of the charge on said storage capacitor has been initiated, in preparation for a subsequent speed measurement.

5. The method of detecting the velocity of an object moving along a given path past a sensor which develops two electrical signals on different circuits, each signal enduring for a time interval that varies inversely with the speed of the moving object and that also varies as an inverse function of the distance between the object and the sensor, said signals being spaced by a time gap that varies inversely with the speed of the moving object and that also varies as a function of the distance between the object and the sensor, within a given speed range, said method comprising the following steps:
  A. maintaining a first capacitor circuit and a second capacitor circuit in an initial charge condition before initiation of said signals;
  B. initiating a change in the charge condition of said first capacitor circuit through a first network having a given time constant upon initiation of one of said signals;
  C. continuing said change in the charge condition of said first capacitor circuit through a modified network having a substantially different time constant upon expiration of said one signal;
  D. interrupting the change in charge condition of said first capacitor circuit upon expiration of an extended time interval longer than the longest possible time gap within said speed range or upon initiation of the other signal, whichever first occurs;
  E. initiating a change in the charge condition of said second capacitor circuit through a second network having a time constant equal to said given time constant upon initiation of the other signal;
  F. continuing said change in the charge condition of said second capacitor circuit through a modified discharge network having a time constant equal to said different time constant upon expiration of said other signal;
  G. interrupting the change in charge condition of said second capacitor circuit upon expiration of an extended time interval longer than the longest possible time gap within said speed range or upon initiation of said one signal, whichever first occurs; and
  H. comparing the residual charges on said capacitor circuits to determine which charge has changed the least from the initial charge condition, the residual charge on the least-changed capacitor circuit being indicative of the speed of the object and the least-changed capacitor circuit identifying the direction of movement.

6. The method of detecting the velocity of a moving object, according to claim 5, in which the comparison of step H is initiated immediately following the first interruption of change in charge condition to occur (steps D and G), the direction of movement being indicated by a crossover between the charge conditions of said capacitor circuits.

7. The method of detecting the velocity of a moving object, according to claim 6, comprising the following additional steps:
  I. Modifying the charge on a storage capacitor in accordance with the terminal charge condition of the least-changed capacitor circuit as determined by step H, and subsequently holding the charge on said storage capacitor, thereafter, independently of further changes in charge condition of said capacitor circuits; and
  J. restoring both capacitor circuits to said initial charge condition, upon completion of steps A through G, in preparation for a subsequent speed measurement.

8. The method of detecting the velocity of a moving object, according to claim 7, in which said capacitor circuits are charged to a given initial voltage in step A, discharged at a first rate determined by said given time constant in steps B and E, and discharged at a substantially faster rate determined by said different time constant in steps C and F.

9. A speed detector for detecting the speed of an object moving along a given path past a sensor which develops two electrical signals each enduring for a time interval that varies inversely with the speed of the moving object and that also varies as an inverse function of the distance between the object and the sensor, said signals being spaced by a time gap that varies inversely with the speed of the moving object and that also varies as a function of the distance between the object and the sensor, said speed detector comprising:

a capacitor circuit;

charge-establishing means for normally maintaining said capacitor circuit in a given charge condition;

a preliminary network, having a given time constant when connected to said capacitor circuit;

a secondary network having a substantially different time constant when connected to said capacitor circuit;

charge switching means, preliminary switching means, and secondary switching means for connecting said capacitor circuit to said charge-establishing means, to said preliminary network, and to said secondary network, respectively;

logic means, coupled to said sensor, and to all of said switching means, for actuating said switching means in accordance with the following operational program:

A. actuating said charge switching means and said preliminary switching means to disconnect said capacitor circuit from said charge-establishing means and to connect said capacitor circuit to said preliminary network upon initiation of the first of said signals;

B. actuating said secondary switching means to connect said capacitor circuit to said secondary network upon termination of said first signal; and C. actuating said preliminary switching means and said secondary switching means to disconnect said capacitor circuit from both said networks upon initiation of the second signal;

and output means for measuring the terminal charge on said capacitor circuit to determine the speed of said object.

10. A speed detector according to claim 9, in which said capacitor circuit comprises a plurality of individual capacitors connected in series with each other, and in which said charge-establishing means, said preliminary network and said secondary network each include a corresponding plurality of individual resistors each connectable in parallel with a selected one of the capacitors in said network.

11. A speed detector according to claim 10, in which said charge switching means comprises a plurality of solid-state switching devices, one connected in series with each resistor in said charge-establishing means, said preliminary switching means comprises a plurality of solid-state switching devices, one connected in series with each resistor in said preliminary network, and said secondary switching means comprises a plurality solid-state switching devices, one connected in series with each resistor in said secondary network, for connecting said resistors to and disconnecting said resistors from said capacitors in said capacitor circuit, all of said switching devices being coupled to said logic means.

12. A speed detector according to claim 10, in which said charge-establishing means comprises a regulated voltage supply for charging said capacitor circuit to a given voltage, and in which said preliminary network and said secondary network comprise discharge resistor networks for discharging said capacitor circuit.

13. A speed detector according to claim 9, in which said output means comprises a sample-hold amplifier for maintaining the terminal charge from said capacitor circuit in storage for a substantial period of time, independently of further changes in the charge on said capacitor circuit.

14. A speed detector for detecting, within given speed range, the speed of an object moving along a given path past a sensor which develops two electrical signals A and B occurring in a sequence indicative of the direction of movement of said object and each enduring for a time interval that varies inversely with the speed of the moving object and that also varies as an inverse function of the distance between the object and the sensor, said signals being spaced by a time gap that varies inversely with the speed of the moving object and that also varies as a function of the distance between the object and the sensor, said speed detector comprising:

an A signal sampler and a B signal sampler, each including:

a capacitor circuit;

a charge-estabshing means for normally maintaining said capacitor circuit in an initial charge condition;

a preliminary network having a given time constant when connected to said capacitor circuit;

a secondary network having a substantially different time constant when connected to said capacitor circuit; and charge switching means, preliminary switching means, and secondary switching means for connecting said capacitor circuit to said charge-establishing means, to said preliminary network, and to said secondary network, respectively;

logic means, coupled to said sensor and to the switching means in both said samplers, for actuating said switching means in accordance with the following operational program:

1. actuating said charge switching means and said preliminary switching means in each sampler to disconnect said capacitor circuit from said charge-establishing means and connect said capacitor circuit to said preliminary network in each sampler upon initiation of the sensor signal for that sampler;

2. actuating said secondary switching means in each sampler to connect said capacitor circuit to said secondary network in each sampler upon termination of the sensor signal for that sampler; and 3. actuating said preliminary switching means and said secondary switching means in each sampler to disconnect said capacitor circuit from both said networks, in each sampler, upon initiation of the sensor signal for the other sampler or upon expiration of an extended time interval longer than the longest possible time gap within said speed range, whichever first ocurs;

comparison means for comparing the residual charges on said capacitor circuits to determine which has changed the least from said initial charge condition and thereby determine the direction of movement of said object;

and output means for measuring the terminal charge on the least-changed capacitor circuit to determine the speed of said object.

15. A velocity detector according to claim 14, in which the capacitor circuit in each sampler comprises a plurality of capacitors connected in series, and in which said charge-establishing means, said preliminary network, and said secondary network, in each sampler, each comprises a corresponding plurality of resistors individually connectable in parallel with individual ones of said capacitors.

16. A velocity detector according to claim 15, in which said charge-establishing means in each sampler includes a voltage-regulated power supply for charging the capacitor circuit of said sampler to an initial voltage, the distribution of charge on the individual capacitors in the capacitor circuit being determined by the relative resistances of the resistors in said charge-establishing means, and in which said preliminary and secondary networks in each sampler comprise discharge networks for discharging their respective capacitor circuits.

17. A velocity detector according to claim 16, in which there are three capacitors in said capacitor circuit in each sampler and in which the capacitors in each capacitor circuit and the resistors in each preliminary network are selected to discharge said capacitors approximately in accordance with the function $$F(t) = 235.5e^{-156.1t} + 54.5e^{-29.8t} + 9.0e^{-4.6t} + 1.$$

18. A velocity detector according to claim 16 in which said charge switching means comprises a plurality of solid-state switching devices, one in series with each resistor in said charge-establishing means, said preliminary switching means comprises a plurality of solid-state switching devices, one connected in series with each resistor in said preliminary network, and said secondary switching means comprises a plurality of solid-state switching devices, one connected in series with each resistor in said secondary network, in each sampler, for connecting said resistors to and disconnecting said resistors from said capacitors in said capacitor circuits, all of said switching devices being coupled to said logic means.

19. A velocity detector according to claim 14 in which each sampler includes a sample-hold amplifier connected to said capacitor circuit.

20. A velocity detector according to claim 19 in which said comparison means includes a crossover detector comprising a differential amplifier having two inputs, each input connected to the output of the sample-hold amplifier in a respective one of said samplers, the output of said differential amplifier having a polarity indicative of the direction of movement of said object.

21. A velocity detector according to claim 19, in which said output means comprises an output sample-hold amplifier, a first solid-state switching device connecting the input of said output amplifier to the output of said A sampler, and a second solid-state switching device connecting the input of said output amplifier to the output of said B sampler, said solid-state switching devices being actuated by said comparison means so that said output sample-hold amplifier stores the terminal charge of said least-changed capacitor circuit even though the capacitor circuits of both samplers are returned to their initial charge condition.

22. The method of detecting the speed of an object moving along a given path past a sensor which develops two electrical sensor signals, each enduring for a time interval that varies inversely with the speed of the moving object and that also varies as an inverse function of the distance between the object and the sensor, said sensor signals being spaced by a time gap that varies inversely with the speed of the moving object and that also varies as a function of the distance between the object and the sensor, said method comprising the following steps:

A. maintaining an electrical signal storage circuit in an initial signal storage condition before initiation of said sensor signals;

B. initiating a change in the signal storage condition of said storage circuit through a first network having a given time constant upon initiation of the first of said sensor signals;

C. continuing said change in the signal storage condition of said storage circuit through a modified network having a substantially different time constant upon expiration of the first sensor signal; and D. interrupting the change in signal storage condition of said storage circuit upon initiation of the second sensor signal, the residual signal stored in the storage circuit being indicative of the speed of the object.

23. The method of detecting the velocity of an object moving along a given path past a sensor which develops two electrical sensor signals on different circuits, each sensor signal enduring for a time interval that varies inversely with the speed of the moving object and that also varies as an inverse function of the distance between the object and the sensor, said sensor signals being spaced by a time gap that varies inversely with the speed of the moving object and that also varies as a function of the distance between the object and the sensor, within a given speed range, said method comprising the following steps:

A. maintaining a first electrical signal storage circuit and a second electrical signal storage circuit in an initial signal storage condition before initiation of said sensor signals;

B. initiating a change in the signal storage condition of said first signal storage circuit through a first network having a given time constant upon initiation of one of said sensor signals;

C. continuing said change in the signal storage condition of said first storage circuit through a modified network having a substantially different time constant upon expiration of said one sensor signal;

D. interrupting the change in signal storage condition of said first storage circuit upon expiration of an extended time interval longer than the longest possible time gap within said speed range or upon initiation of the other sensor signal, whichever first occurs;

E. initiating a change in the signal storage condition of said second storage circuit through a second network having a time constant equal to said given time constant upon initiation of the other sensor signal;

F. continuing said change in the signal storage condition of said second storage circuit through a modified discharge network having a time constant equal to said different time constant upon expiration of said other sensor signal;

G. interrupting the change in signal storage condition of said second storage circuit upon expiration of an extended time interval longer than the longest possible time gap within said speed range or upon initiation of said one sensor signal, whichever first occurs; and H. comparing the residual signals stored in said storage circuits to determine which stored signal has changed the least from the initial signal storage condition, the residual stored signal in the least-changed storage circuit being indicative of the speed of the object and the least-changed signal storage circuit identifying the direction of movement.

24. The method of detecting the velocity of a moving object, according to claim 23, in which the comparison of step H is initiated immediately following the first interruption of change in signal storage condition to occur (steps D and G), the direction of movement being indicated by a crossover between the signal storage conditions of said storage circuits.

* * * * *